(12) United States Patent
Stephens et al.

(10) Patent No.: US 7,447,232 B2
(45) Date of Patent: Nov. 4, 2008

(54) DATA BURST TRANSMISSION METHODS IN WLAN DEVICES AND SYSTEMS

(75) Inventors: Adrian P Stephens, Cottenham (GB); Duncan Kitchin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 917 days.

(21) Appl. No.: 10/677,055

(22) Filed: Sep. 30, 2003

(65) Prior Publication Data
US 2005/0068900 A1    Mar. 31, 2005

(51) Int. Cl.
*H04J 3/16* (2006.01)
*H04J 3/26* (2006.01)
*H04Q 7/00* (2006.01)

(52) U.S. Cl. .................. 370/471; 370/329; 370/432

(58) Field of Classification Search ............... 370/328, 370/335, 336, 342, 337, 345, 208, 210, 474, 370/204, 469, 465, 542, 470, 471, 473, 329, 370/330, 390, 391, 392, 389, 395.2, 395.21, 370/468; 375/242, 535
See application file for complete search history.

(56) References Cited

U.S. PATENT DOCUMENTS

| | | | |
|---|---|---|---|
| 4,495,619 A | 1/1985 | Acampora | |
| 4,630,126 A | 12/1986 | Kaku et al. | |
| 4,797,898 A | 1/1989 | Martinez | |
| 5,007,047 A | 4/1991 | Sridhar et al. | |
| 5,577,087 A | 11/1996 | Furuya | |
| 5,596,315 A * | 1/1997 | Olds et al. | 340/7.2 |
| 5,706,428 A | 1/1998 | Boer et al. | |
| 5,828,695 A | 10/1998 | Webb | |
| 5,987,034 A * | 11/1999 | Simon et al. | 370/465 |
| 6,721,333 B1 * | 4/2004 | Milton et al. | 370/469 |
| 6,925,070 B2 * | 8/2005 | Proctor, Jr. | 370/335 |
| 6,959,020 B1 * | 10/2005 | Hourunranta et al. | 370/542 |
| 6,987,754 B2 * | 1/2006 | Shahar et al. | 370/349 |
| 7,065,036 B1 * | 6/2006 | Ryan | 370/208 |

(Continued)

FOREIGN PATENT DOCUMENTS

EP    1130837 A2    9/2001

(Continued)

OTHER PUBLICATIONS

"IEEE Standard Part 11: Wireless LAN Medium Access Control (MAC) and Physical Layer (PHY) Specification", *ISO/IEC 8802-11, ANS/IEEE Std 802.11, 1st Edition, Chapter 9: MAC Sublayer Functional Description*, (Aug. 20, 1999), 70-97.

(Continued)

*Primary Examiner*—Hanh Nguyen
(74) *Attorney, Agent, or Firm*—John F. Travis

(57) ABSTRACT

A wireless local area network (WLAN) device transmits a header over an air interface, at a first modulation rate. The header may include an indication of a second modulation rate that will be used to transmit a consolidated payload. In one embodiment, the header includes information that enables a receiver to determine when an end of each of the multiple data units will occur. The device farther transmits the consolidated payload at the second modulation rate. The consolidated payload includes multiple data units. In one embodiment, the consolidated payload includes information that enables the receiver to determine when an end of each of the multiple data units will occur.

4 Claims, 18 Drawing Sheets

U.S. PATENT DOCUMENTS

| | | | |
|---|---|---|---|
| 7,164,663 B2 * | 1/2007 | Frank et al. ................. | 370/328 |
| 2001/0033560 A1 | 10/2001 | Tong et al. | |
| 2002/0131486 A1 | 9/2002 | Haartsen | |
| 2002/0136170 A1 | 9/2002 | Struhsaker | |
| 2002/0150077 A1 | 10/2002 | Temerinac | |
| 2003/0169769 A1 | 9/2003 | Ho et al. | |
| 2005/0032478 A1 | 2/2005 | Stephens et al. | |
| 2005/0068895 A1 | 3/2005 | Stephens et al. | |

FOREIGN PATENT DOCUMENTS

| | | |
|---|---|---|
| WO | WO-02054805 A1 | 7/2002 |
| WO | WO-2005/034436 A1 | 4/2005 |
| WO | WO-2005/034475 A1 | 4/2005 |

OTHER PUBLICATIONS

"International Search Report filed in corresponding PCT Application PCT/US2004/031887", (Dec. 30, 2004),5 pgs.

Grünheid, R., et al., "Adaptive Modulation for the HIPERLAN/2 Air Interface", *5th International OFDM-Workshop 2000*, (2000),4-1-4-4.

Ji, Z., et al.,"Exploiting Medium Access Diversity in Rate Adaptive Wireless LANs", *MobiCom 2004*, Philadlephia, Pennsylvania, USA, http://pcl.cs.ucla.edu/papers/files/mobicom04-ji.pdf,(Sep. 2004),345-359.

Kleindl, DR., G., "Signaling for Adaptive Modulation", *IEEE 802. 11-03/283r0*, (May 2003),12 pgs.

* cited by examiner

DATA BURST TRANSMISSION METHODS IN WLAN DEVICES AND SYSTEMS

TECHNICAL FIELD

The inventive subject matter pertains to wireless local area networks (WLANs) and, more particularly, to transmission of data packets between a transmitter and a receiver in a WLAN.

BACKGROUND

Any Wireless Local Area Network (WLAN) device that supports an Institute of Electrical and Electronics Engineers (IEEE) 802.11 Standard (e.g., IEEE Std 802.11-1997, 802.11a, 802.11e, etc.) includes two main parts: 1) a physical (PHY) layer signaling control device; and 2) a medium access control (MAC) device. The function of the PHY device is to transfer data packets over the air interface. Among other things, the function of the MAC device is to fairly control access to the shared air interface.

The minimal MAC protocol consists of two frames: 1) a frame sent from a transmitter to a receiver; and 2) an acknowledgment (ACK) from the receiver that the frame was received correctly. If a transmitter has multiple packets to send to the receiver, some versions of the 802.11 Standard require the transmitter to wait for an ACK after transmission of each packet. In addition, the transmitter must wait for a particular time interval, referred to as the Interframe Space (IFS), after receiving the ACK and before transmitting the next packet.

Other versions of the 802.11 Standard (e.g., IEEE Std 802.11e) support transmission of packets with selective acknowledgement. This feature is referred to as "Block ACK." The Block ACK feature enables the transmitter to send the next packet to the same receiver without necessarily waiting for an ACK. Instead, after negotiating for access to the air interface, the transmitter sends the first packet, waits an IFS after the end of the first packet, and sends the next packet. After the transmitter has sent all of its packets to the receiver, the transmitter asks the receiver for a response, which indicates an ACK for all of the previously transmitted packets.

Although the Block ACK feature has provided some throughput improvements, developers continue to strive for ways of further increasing throughput. Accordingly, what are needed are methods and apparatus for further improving throughput using burst-mode transmissions.

BRIEF DESCRIPTION OF THE DRAWINGS

The appended claims point out different embodiments of the inventive subject matter with particularity. However, the detailed description presents a more complete understanding of the inventive subject matter when considered in connection with the figures, wherein like-reference numbers refer to similar items throughout the figures and:

DETAILED DESCRIPTION

In the following description of various embodiments, reference is made to the accompanying drawings, which form a part hereof and show, by way of illustration, specific embodiments in which the inventive subject matter may be practiced. Various embodiments are described in sufficient detail to enable those skilled in the art to practice the inventive subject matter, and it is to be understood that other embodiments may be utilized, and that process or mechanical changes may be made, without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed. It will be recognized that the methods of various embodiments can be combined in practice, either concurrently or in succession. Various permutations and combinations will be readily apparent to those skilled in the art.

Embodiments of the inventive subject matter include ways of transmitting multiple packets in a burst mode (i.e., in succession). Various embodiments will be described in detail below, after a description of a wireless local area network (WLAN) system and a WLAN device, in conjunction with FIGS. 1 and 2. Various embodiments can be implemented in systems and devices such as the system and device described in conjunction with FIGS. 1 and 2. Various embodiments also can be implemented in other systems and devices, which have different configurations.

Figure 1:
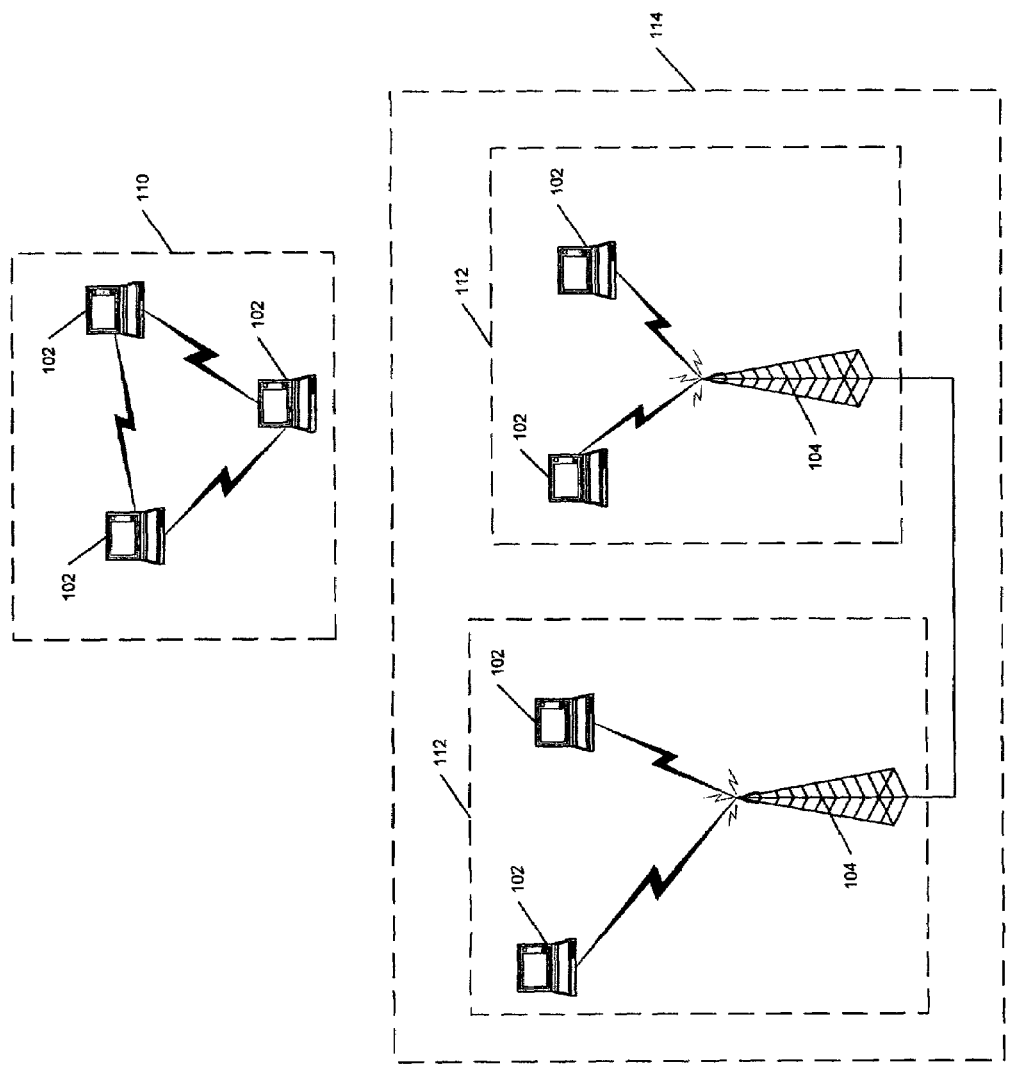
FIG. 1 is a simplified diagram of example WLANs, in accordance with an embodiment of the inventive subject matter.

FIG. 1 is a simplified diagram of example WLANs in accordance with an embodiment of the inventive subject matter. A WLAN may include multiple network stations 102 and zero or more access points (APs) 104.

In a WLAN, network stations 102 communicate over the medium of free space, commonly referred to as the "air interface." Generally, a station 102 may be referred to as a network adapter or network interface card (NIC). A station 102 may be mobile, portable or stationary. For example, a station 102 may be a laptop computer, a handheld radio, a desktop computer, or virtually any other one-way or two-way device with the capability of communicating with other devices 102 or APs 104 over a wireless medium.

A set of stations 102 may communicate directly with each other, as is the case in a Basic Service Set (BSS). An Independent BSS (IBSS) 110 is a BSS in which there is no connection to a wired network.

An infrastructure BSS 112 is a BSS in which a BSS includes an AP 104. In an infrastructure BSS, all stations 102 communicate with an AP 104. The AP 104 provides the connection to the wired LAN, if any, and the local relay function for the BSS. Accordingly, if a first station 102 wants to communicate with a second station 102, the first station 102 sends the communication to the AP 104, and the AP 104 relays the communication to the second station 102.

An Extended Service Set (ESS) 114 is a set of infrastructure BSSs 112, where the APs 104 communicate among themselves to forward traffic from one BSS 112 to another, and to facilitate the movement of stations 102 from one BSS to another. The Distribution System (DS) is a mechanism by which one AP 104 communicates with another to exchange frames from stations 102 in their BSSs 112, forward frames to follow mobile stations 102 from one BSS 112 to another, and exchange frames with wired networks, if any.

Embodiments of the invention will now be described in more detail. Although various embodiments are described in detail, below, using terms that are similar to terms used in the context of an IEEE 802.11 Standard (e.g., IEEE Std 802.11-1997, 802.11a, 802.11e, etc.), the invention is not meant to be limited to use within a system that uses an IEEE 802.11 Standard. Instead, embodiments of the invention could be used in conjunction with other WLAN standards, as well.

Figure 2:
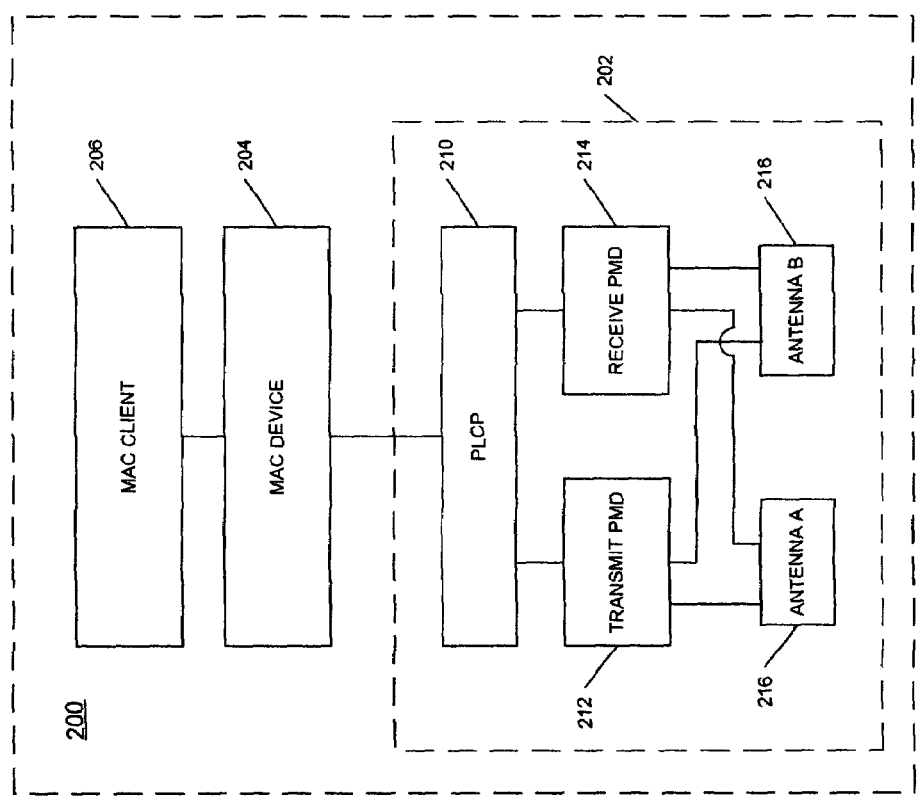
FIG. 2 is a simplified block diagram of a WLAN station, in accordance with an embodiment of the inventive subject matter.

FIG. 2 is a simplified block diagram of a WLAN station 200 (e.g., stations 102, 104, FIG. 1) in accordance with an embodiment of the inventive subject matter. Any WLAN station 200 that supports an IEEE 802.11 Standard includes a physical (PHY) layer signaling control device 202 (PHY device), a medium access control (MAC) device 204, and a MAC client 206. WLAN station 200 supports station services, which are provided by PHY device 202 and MAC device 204, and used by MAC client 206. These services may include authentication, deauthentication, privacy, and delivery of data.

The MAC client 206 creates and processes data, among other things. The purpose of the PHY and MAC devices 202, 204 is to ensure that two network stations are communicating with the correct frame format and protocol. An IEEE Std 802.11 defines the communication protocol between the PHY and MAC devices 202, 204.

The function of the PHY device 202 is threefold: 1) to provide a frame exchange between the MAC 204 and PHY 202 under the control of a physical layer convergence procedure (PLCP) sublayer; 2) to transmit data frames over the air interface under the control of the physical medium dependent (PMD) sublayer; and 3) to provide a carrier sense indication back to the MAC 204 so the MAC 204 is able to verify activity on the air interface.

The PHY device 202 implements one of several physical layer specifications, such as infrared (IR) baseband, frequency hopping spread spectrum (FHSS), direct sequence spread spectrum (DSSS), or orthogonal frequency domain multiplexing (OFDM). Other specifications can be implemented in other embodiments.

In general, the PHY device 202 includes PLCP apparatus 210, and transmit and receive PMD apparatuses 212, 214. Each of these may or may not use some or all of the same physical circuitry (e.g., processors, busses, clocks, storage, etc.). In addition, one or more antennae 216 may be interconnected with PMD apparatus 212, 214. When an IR baseband specification is implemented, a light-emitting diode (LED) (not shown) or other optical transmission device may be used instead of the antennae 216.

As mentioned above, a function of PLCP apparatus 210 is to control the frame exchange between the MAC device 204 and the PHY device 202. The function of PMD apparatuses 212, 214 is to control signal carrier and spread spectrum modulation and demodulation for transmitting and receiving data frames over the air interface.

The structures of PMD apparatuses 212, 214 depend on the particular physical layer specification (e.g., the modulation type) implemented in the station. For example, if DSSS is used, the transmit PMD apparatus 212 may include a scrambler, an adder, a mask filter, and a DBPSK DQPSK modulator, and the receive PMD apparatus 214 may include a de-spread correlator, a DBPSK DQPSK de-modulator, a de-scrambler, and a timing clock recovery device. If FHSS is used, the transmit PMD apparatus 212 may include a data whitener, a symbol mapper, a Gaussian shaping filter, and a modulator, and the receive PMD apparatus 214 may include a de-modulator, a data de-whitener, and a hop timing recovery device. If IR is used, the transmit PMD apparatus 212 may include a symbol mapper, a modulator, and an LED driver, and the receive PMD apparatus 214 may include a diode detector, a de-modulator, and a symbol mapper. If OFDM is used, the transmit PMD apparatus 212 may include a convolutional encoder, a bit interleaving and mapping device, an inverse fast Fourier transform (FFT), a symbol shaper, and a quadrature amplitude modulation (QAM) modulator, and the receive PMD apparatus 214 may include a PSK QAM de-modulator, an FFT, a bit de-interleaving and de-mapping device, a convolutional decoder, and a clock recovery device.

Among other things, the function of the MAC device 204 is to control access to the shared air interface. The MAC device 204 provides an interface between the MAC client 206 and the PHY device 202. In addition, the MAC device 204 may or may not perform encryption and decryption. In on embodiment, the MAC device supports the MAC sublayer according to an IEEE Std 802.11. In other embodiments, the MAC device supports the MAC sublayer according to another standard.

Because the air interface is often very noisy and unreliable, an IEEE Std 802.11 MAC device 204 implements a frame exchange protocol to allow the source of a data frame to determine whether the frame has been successfully received at the destination. The minimal MAC protocol consists of two frames: 1) a sent frame that includes a frame sent from the transmitter to the receiver; and 2) a response frame that includes an acknowledgment (ACK) from the receiver that the sent frame was received correctly. In addition, a sent frame might be one of the following: an acknowledgement (ACK), a request to send (RTS), a clear to send (CTS), or a PS-Poll. The corresponding response frames would be, respectively: a fragment; a CTS; a data frame; and an ACK.

Figure 3:
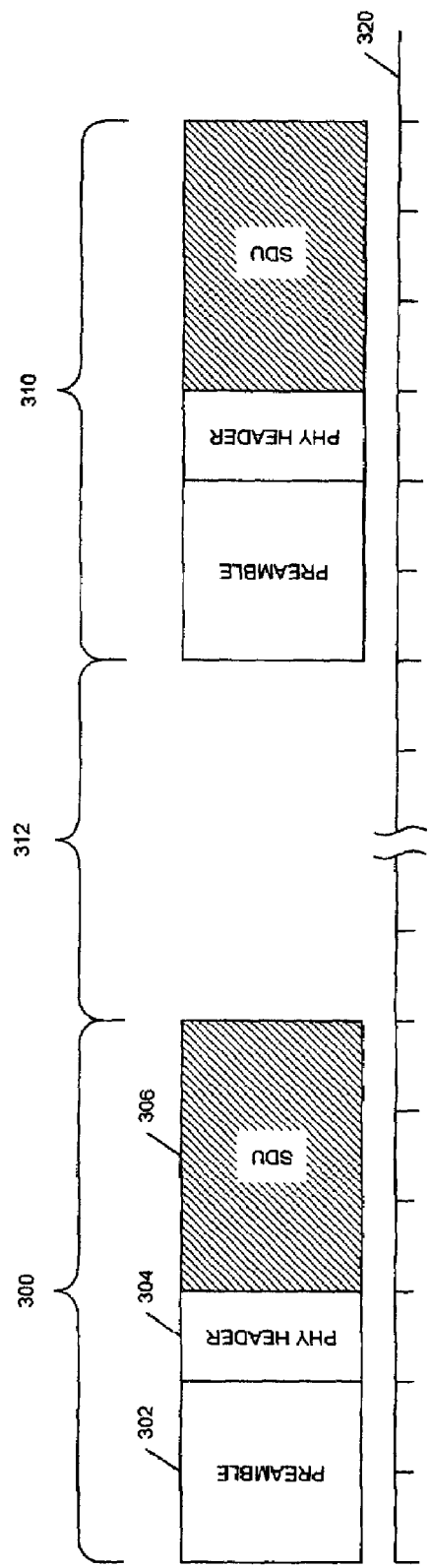
FIG. 3 illustrates an example of a timing diagram for transmitting multiple PHY protocol data unit (PPDU) frames, each with a single service data unit (SDU)

FIG. 3 illustrates an example of a timing diagram for transmitting multiple PHY protocol data unit (PPDU) frames, each carrying a single service data unit (SDU). The PPDU frames 300, 310 represent the format of a frame as it is transmitted over the air interface. A PPDU frame includes a preamble 302, a PHY header 304, and a SDU 306, in an embodiment.

The preamble 302, the PHY header 304, and the SDU 306 each are transmitted at the beginning of a symbol boundary, as indicated by the tic marks on the time axis 320 of FIG. 3. Each symbol may have a pre-determined duration, or a duration that changes within different parts of the packet. For example, a symbol duration may be 4 microseconds, although it can be longer or shorter, as well.

The preamble 302 includes a pattern of bits, which the receiver uses to synchronize itself. Specifically, the receiver may use the preamble 302 to perform the following tasks: 1) packet start acquisition; 2) channel estimation; 3) antenna diversity and training; 4) receiver automatic gain control (AGC); 5) carrier offset; and 6) symbol timing.

Within the PHY header 304 are a rate field and a length/size field, in one embodiment. The rate field indicates which type of modulation must be used to receive the incoming SDU 306. In an alternate embodiment, the rate of the incoming SDU 306 is determined in advance between a transmitting and receiving station, and thus the rate information may not be included in the PHY header 304.

The length/size field indicates the length of the SDU 306. In various embodiments, the length/size field can include a number of microseconds necessary to transmit the SDU 306, a number of bytes in the SDU 306, or some other value indicating the length of the SDU 306. The PHY header 304 may also include a checksum or other field, which enables its contents to be validated. The PHY header 304 could have a fixed or variable length.

The SDU 306 is a series of fields that is assembled by the MAC 204 (FIG. 2) and passed to the PHY 202 via PLCP 210. As far as the PHY 202 is concerned, the SDU 306 includes "opaque data," meaning that the PHY 202 does not know or care what data is included in the SDU 306.

The SDU 306 can be of a variable length. An SDU frame may be used by the MAC device 204 to transport its MAC protocol data unit (MPDU), which may include an MPDU header, a frame body field, and a frame check sequence (FCS) field. The frame body field is of a variable length, and its contents may or may not be encrypted. This field may contain all or part of a MAC service data unit (MSDU) or protocol service data unit (PSDU) from higher layer protocols.

Different modulation rates may be used to transmit the preamble 302, PHY header 304, and SDU 306. The preamble 302 and PHY header 304 are transmitted at a first rate, referred to herein as a "robust modulation rate." The robust modulation rate may be in a range of approximately 6 megabits per second (Mbps) to 12 Mbps, in an embodiment, although rates higher or lower can be used in other embodiments. The robust modulation rate does not change, in an embodiment. When the robust modulation rate does not change, a receiver knows to look for a preamble 302 and PHY header 304 at the known robust modulation rate. In another embodiment, the robust modulation rate may change. In still another embodiment, the preamble 302 and the PHY header 304 are transmitted at different modulation rates.

In contrast, the SDU 306 may be transmitted at a second rate, referred to herein as a "data modulation rate." For illustration purposes, the SDU 306 is cross-hatched, indicating that it is transmitted at the data modulation rate, as opposed to the robust modulation rate.

The data modulation rate can vary from frame to frame. In an embodiment, the rate varies in a range of between approximately 6 to 240 Mbps. In one embodiment, a receiver determines the data modulation rate for a particular SDU by evaluating the rate field of the PHY header 304, as described above.

The lower modulation rates may be more robust, meaning that the data can tolerate worse channel conditions. The preamble 302 and PHY header 304 are sent at the lower modulation rate, so that the data within the PHY header 304 is less likely to be corrupted, even though corruption is possible given enough interference signal power. If the data within the rate field of the PHY header 304 were corrupted, for example, the receiver would be unable to demodulate the SDU 306. If the data within the size field of the PHY header 304 were corrupted, the receiver would either truncate the SDU 306 or would extend the SDU 306, causing the receiver to demodulate invalid data after the end of the SDU 306.

The data modulation rate for the SDU 306 can be chosen based on an estimate of channel conditions. If the channel is excellent, then a high rate (e.g., approaching 240 Mbps) may be selected, thus increasing the throughput of the system. If the channel is very noisy, then a relatively low rate (e.g., approaching 6 Mbps) may be selected, so that the data integrity can be maintained as best possible.

In various embodiments, each packet is fully or partially "self-describing," meaning that the receiver does not need a priori information about the structure (i.e., the data rate and/or size) of the upcoming packet. In one embodiment, each packet is fully self-describing, meaning that each packet includes both the data modulation rate, in the PHY header 304, and also the length/size information. The length/size information is included in the PHY header 304, in one embodiment, and in the SDU itself, in another embodiment.

In another embodiment, each packet is partially self-describing, meaning that each packet includes the length/size information, but the data modulation rate may be defined between the transmitting and receiving station in a prior training exchange. Accordingly, the data modulation rate is not necessarily included in the PHY header 304.

This "self-describing" feature differentiates embodiments of the invention from other protocols, such as the Hiperlan 2 protocol, for example. Using the Hiperlan 2 protocol, the transmitter emits a known block of data every 2 milliseconds. That block of data includes a complete map of everything that the transmitter will transmit for the remainder of the upcoming 2 millisecond time period. This means that all receivers have a priori information about the modulation rates and lengths of the packets that the transmitter will send. The modulation and length information is not included in each packet, using Hiperlan 2, and thus the packets are not "self-describing."

As discussed previously, prior art systems support "burst-mode" transmission of PPDU frames with selective acknowledgement using the "Block ACK" feature. The Block ACK feature enables the transmitter to send the next PPDU frame to the same receiver without necessarily waiting for an ACK. Instead, after negotiating for access to the air interface, the transmitter sends the first PPDU frame, waits an Interframe Space (IFS) after the end of the first packet, and sends the next PPDU frame.

The term "IFS," as used herein, is meant to include various related time periods, including but not limited to the IFS, a Short IFS (SIFS), a Priority IFS (PIFS), a Distributed IFS (DIFS), and an Extended IFS (EIFS), as defined in an IEEE 802.11 Standard, although the term IFS is not meant to be limited to time periods defined only in such a standard. The IFS may consume multiple symbol boundaries. FIG. 3 illustrates a second PPDU 310 being transmitted after a symbol gap 312 of four or more symbols, which can represent an IFS. An IFS can be an integer or non-integer number of symbol widths. In addition, the duration of the IFS can be longer or shorter than four symbols.

Using the Block ACK feature, after the transmitter has sent all of its PPDU frames to the receiver, the transmitter asks the receiver for a response, which indicates an ACK for all of the previously transmitted frames. Using prior art methods, each PPDU frame includes a single SDU, and each PPDU frame is formatted essentially as described in conjunction with FIG. 3.

In accordance with various embodiments of the inventive subject matter, a single PPDU frame includes one or more opaque, concatenated SDUs, where the one or more SDUs are referred to herein as the "payload." In an embodiment, each SDU includes a "delimiter," which indicates the size of the SDU, and the PHY header may include a length field that includes the entire length of the concatenated SDUs. In another embodiment, the PHY header contains length information for each SDU, enabling the receiver to assemble and re-divide the payload into the distinct SDUs.

In still another embodiment, each PPDU frame includes a single SDU. However, during burst mode, multiple PPDU frames are concatenated together, rather than waiting the IFS between each frame. In still another embodiment, multiple PPDU frames are concatenated together, but a shortened preamble is included with each PPDU frame after the first frame. In still another embodiment, multiple PPDU frames are concatenated together, but the preamble is eliminated for each PPDU frame after the first frame. Various embodiments will now be described in conjunction with FIGS. 4-18.

Figure 4:
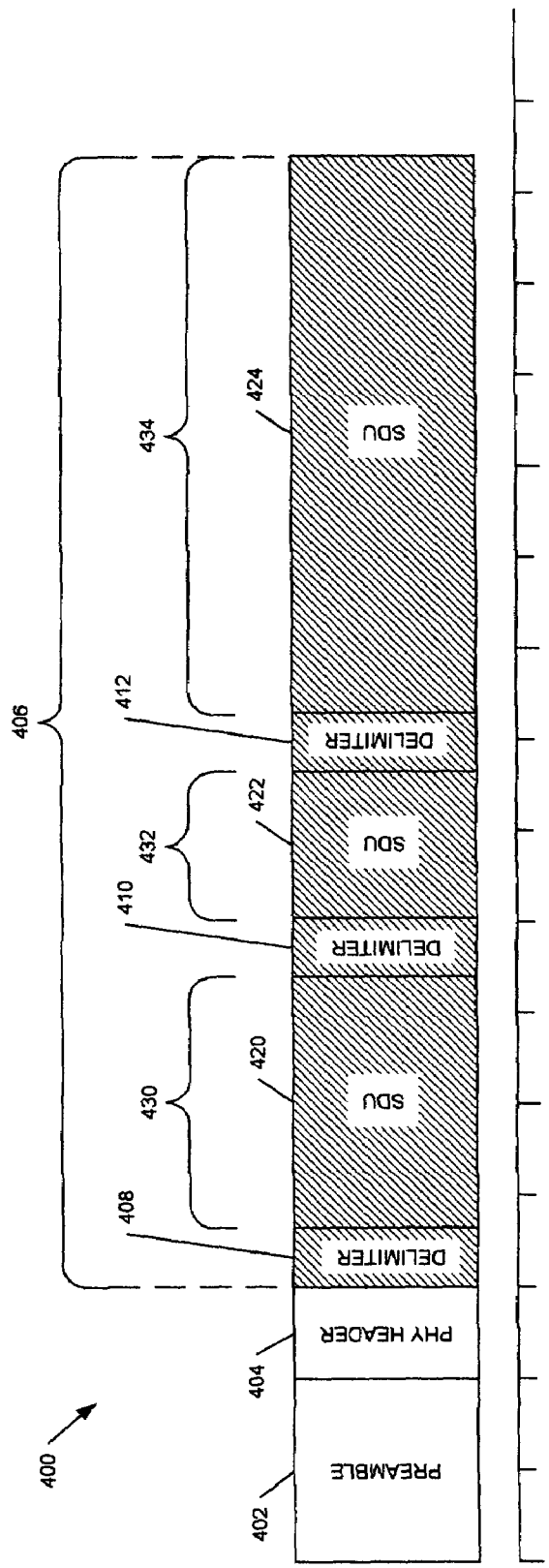
FIG. 4 illustrates an example of a timing diagram for transmitting a PPDU that may contain multiple SDUs and delimiters, in accordance with an embodiment of the inventive subject matter.

FIG. 4 illustrates an example of a timing diagram for transmitting a PPDU that may contain multiple SDUs and delimiters, in accordance with an embodiment of the inventive subject matter. The PPDU 400 includes a preamble 402, PHY header 404, and a consolidated payload 406 with at least one SDU 420, 422, 424. In the illustrated example, the consolidated payload 406 includes three SDUs. More or fewer SDUs can be included in a single payload.

The preamble 402 includes a pattern of bits, which the receiver uses to synchronize itself, as described above. The PHY header 404 includes a rate field, in one embodiment, which indicates which data modulation rate is used for the consolidated payload 406. In an embodiment, the PHY header 404 also includes a length/size field, which defines the total length of the consolidated payload 406. In various embodiments, the length/size field can include a number of microseconds necessary to transmit the consolidated payload 406, a number of bytes in the consolidated payload 406, or some other value indicating the length of the consolidated payload 406. In another embodiment, the PHY header 404 does not include the total length information. The PHY header 404 could have a fixed or variable length.

Each SDU 420, 422, 424 must be separated and delivered intact by the PHY in the receiver. To facilitate decomposition of the consolidated payload 406 into individual SDUs, the consolidated payload also includes information indicating the lengths of each of the multiple SDUs. In an embodiment, the information includes multiple "delimiters" 408, 410, 412, where each SDU is preceded by a delimiter, in an embodiment.

Each delimiter includes a length field, which indicates the variable length 430, 432, 434 of the SDU 420, 422, 424, respectively, that follows. If the following SDU is not the last SDU in the consolidated payload 406, the delimiter information also enables a receiver to determine where the next SDU's delimiter should be located.

In an embodiment, each delimiter 408, 410, 412 also includes a length validation field, which enables a receiver to determine whether or not the length field has been corrupted, as described in more detail later. In an embodiment, the length validation field includes a checksum or CRC, although other validation information can be used in other embodiments. The length validation field enables robust error detection, as will be described in detail in conjunction with FIGS. 5 and 6.

In addition, in an embodiment, each delimiter 408, 410, 412 may also include a sequence field, which indicates that the SDU 420, 422, 424, respectively, that follows is either the last SDU or is not the last SDU. In other embodiments, the delimiter may not include either or both the length validation field or the sequence field.

In an embodiment described above, a one-to-one correlation exists between delimiters and SDUs. In another embodiment, a one-to-one correlation may not exist between delimiters and SDUs. Instead, a fewer number of delimiters than the number of SDUs can be transmitted. For example, a single delimiter can be transmitted, which indicates the lengths of all of the SDUs.

Figure 5:
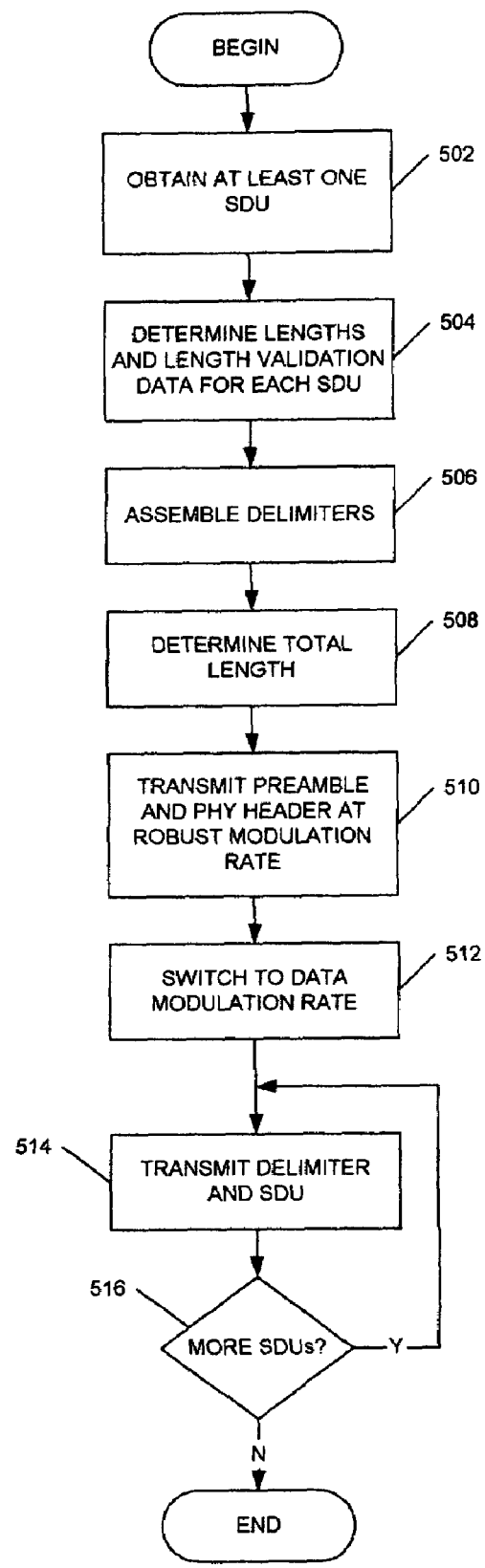
FIG. 5 is a flowchart of a procedure for a transmitter to assemble and transmit a PPDU, such as that illustrated in FIG. 4, in accordance with an embodiment of the inventive subject matter.

FIG. 5 is a flowchart of a procedure for a transmitter to assemble and transmit a PPDU, such as that illustrated in FIG. 4, in accordance with an embodiment of the inventive subject matter. The method begins, in block 502 when the PHY device obtains at least one SDU. In one embodiment, the SDUs are intermediately or finally destined for the same receiver, although it is possible for the SDUs to have different destinations.

In block 504, the lengths of each SDU and length validation data are determined. For example, in an embodiment, the SDU length is represented by two bytes, and the length validation field includes a checksum or CRC for the two-byte length field. Accordingly, the length validation field also can be two bytes. In other embodiments the length and/or length validation fields can be larger or smaller.

The delimiters for each SDU are assembled, in an embodiment, in block 506. Each delimiter includes the length field, the length validation field, and a sequence field, which indicates whether or not the SDU is the last. In other embodiments, either or both the length validation field or the sequence field can be excluded from the delimiter.

In an embodiment, the total length of the consolidated payload is determined, in block 508, for inclusion in the PHY header. The total length includes the lengths of each of the delimiters, plus the lengths of each of the SDUs. The total length enables the receiver to determine when the end of the consolidated payload should occur. In another embodiment, the total length is not included in the PHY header. For example, in another embodiment, the receiver can rely instead on the sequence field of the delimiter to predict the end of the consolidated payload. As will be explained in more detail later, if a delimiter is corrupted, the receiver may measure the symbol energy to determine whether the end of the consolidated payload has been reached.

After negotiating access to the air interface, the transmitter transmits the preamble and the PHY header over the air at the robust modulation rate, in block 510. In an embodiment, the transmitter begins transmitting each of the preamble and the PHY header at the beginning of a symbol boundary. In an embodiment, the preamble is transmitted for two symbols, and the PHY header is transmitted for one symbol. In other embodiments, either the preamble or the PHY header can be transmitted for longer or shorter time durations.

When transmission of the PHY header is complete, the transmitter switches to the data modulation rate, in block 512, which will be used to transmit the consolidated payload. The transmitter begins transmitting the first delimiter, in block 514. In an embodiment, the transmitter begins transmitting the first delimiter at the beginning of the next symbol boundary after completion of the PHY header. Alternatively, the first delimiter can begin at a time other than a symbol boundary. In other words, transmission can begin before or after a symbol boundary. In an embodiment, the transmitter begins transmitting the consolidated payload within one symbol width of the end of the PHY header. Internal block padding may be included at the end of each SDU.

In an embodiment, the delimiter may take less than one symbol to complete, and the transmitter may begin to transmit the SDU within the latter part of the same symbol as the delimiter. In another embodiment, the transmitter begins transmitting the SDU at the next symbol boundary after completion of the delimiter transmission. Internal block padding may be included at the end of each SDU.

In block 516, a determination is made whether more delimiters and SDUs remain to be transmitted. In another embodiment, this determination can be excluded. If more delimiters and SDUs remain to be transmitted, the transmitter begins transmitting the next delimiter and its associated SDU, in block 514.

In an embodiment, the transmitter begins transmitting the next delimiter promptly upon completion of transmitting the previous SDU, whether or not that time occurs on a symbol boundary. In addition, the transmitter begins transmitting the associated SDU promptly upon completion of transmitting the delimiter. Accordingly, in this embodiment, all of the data within the consolidated payload is efficiently concatenated together. In other embodiments, gaps or filler data can exist between subsequent delimiters and/or SDUs. After transmitting the last SDU, the method ends.

Figure 6:
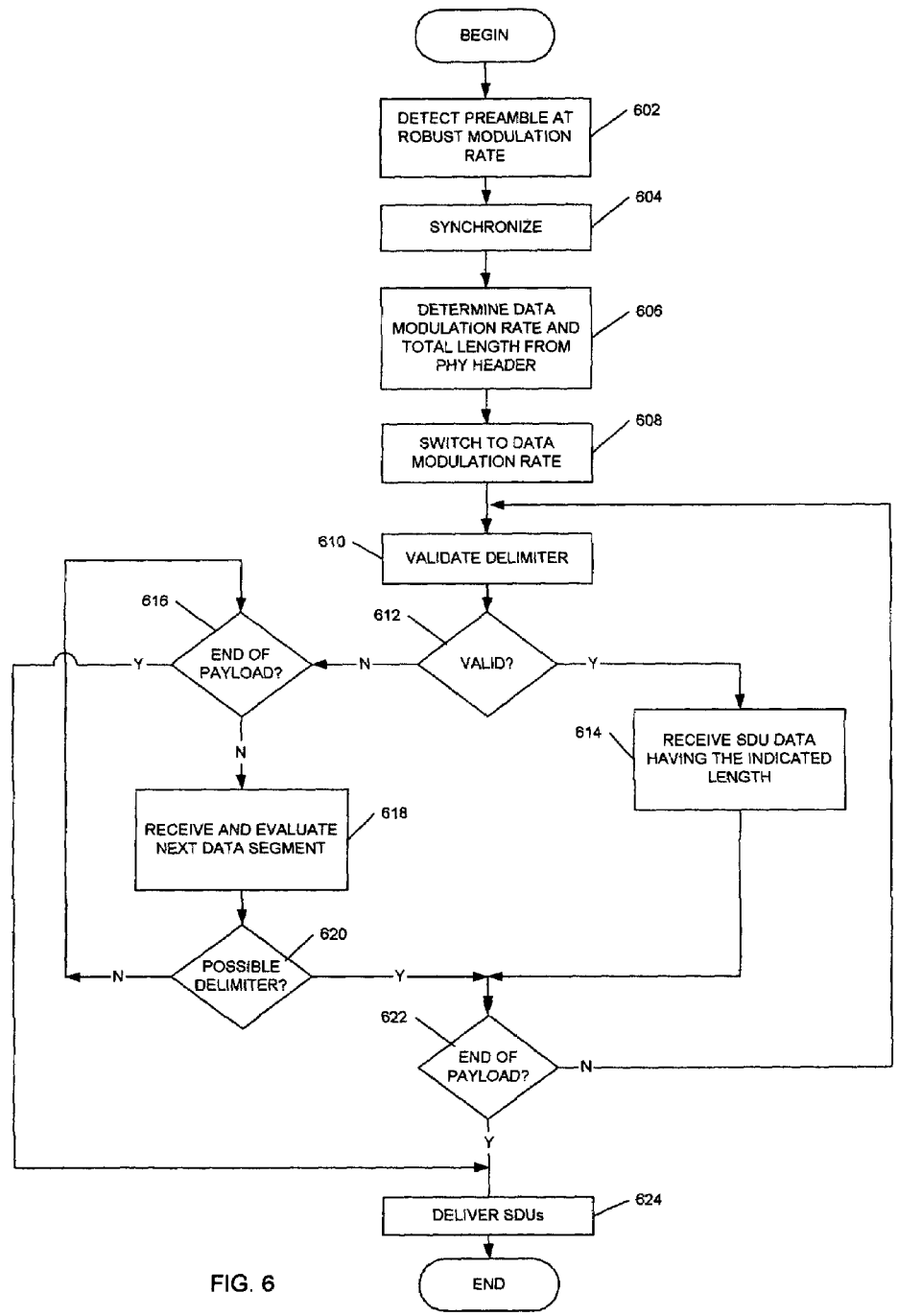
FIG. 6 is a flowchart of a procedure for a receiver to receive and divide a PPDU, such as that illustrated in FIG. 4, in accordance with an embodiment of the inventive subject matter.

FIG. 6 is a flowchart of a procedure for a receiver to receive and divide a PPDU, such as that illustrated in FIG. 4, in accordance with an embodiment of the inventive subject matter. The method begins, in block 602, when the receiver detects an incoming preamble at the robust modulation rate. The receiver uses the preamble to become synchronized with the incoming PPDU frame, in block 604.

In one embodiment, the receiver determines the modulation rate of the PPDU's consolidated payload from the PHY header, in block 606. In an alternate embodiment, the data modulation rate may be determined during a prior training exchange.

In an embodiment, the receiver also determines the entire length of the consolidated payload from the PHY header. This enables the receiver to know how long it should demodulate incoming data at the data modulation rate. In another embodiment, the receiver uses the length and sequence fields in the delimiters to make this determination, and the total length is not necessarily provided in the PHY header. Once receipt of the PHY header has completed, the receiver switches to demodulating at the data modulation rate, in block 608, in order to receive and demodulate the consolidated payload.

The first thing that occurs in the consolidated payload is a delimiter, in an embodiment. Therefore, in block 610, the receiver receives and attempts to validate a segment of data having the size of a delimiter. In an embodiment, the delimiter size is the size of the length field (e.g., two bytes), plus the size of the length validation field (e.g., two bytes), plus the size of the sequence field (e.g., one byte), if it is included. In other embodiments, the absolute or relative sizes of the various delimiter fields can be different.

Validation is performed by determining if the length validation field correlates with the data in the length field. In an embodiment, the length validation field includes a checksum or CRC, which enables the receiver to determine whether the length data is corrupted or uncorrupted.

A determination is made, in block 612, whether the delimiter-sized data segment includes what appears to be a valid delimiter. If so, then in block 614, the receiver receives and stores an amount of SDU data with a length as indicated in the delimiter's length field, and the method proceeds to block 622, which will be described later.

If the delimiter-sized segment does not include what appears to be a valid delimiter, then the receiver transitions to a delimiter search mode, indicated by blocks 616, 618, and 620. In this mode, the receiver determines whether the end of the payload may have been reached, in block 616. In various embodiments, the end of the payload can be determined if no delimiter is detected within an amount of time, or if a known end point has been reached, or if the symbol energy drops below a threshold. If the end of the payload has been reached, the method ends.

If the end of the payload has not been reached, then the receiver receives and evaluates each subsequent delimiter-sized segment of data, in block 618. Subsequent segments can be overlapping or sequential.

A determination is made, in block 620, whether the next delimiter-sized segment of data appears to be a possible delimiter by validating what can be the length field with what can be the length validation field. If the delimiter-sized segment of data does not appear to be a possible delimiter, then the procedure iterates, all the while storing the received data as a potential SDU. When a possible delimiter is detected, the receiver discontinues the delimiter search mode.

A determination is made, in block 622, whether the end of the consolidated payload has been reached. In an embodiment, the receiver knows that it has reached the end of the consolidated payload if it has received an amount of data that corresponds to the total length field provided in the PHY header. In another embodiment, the receiver knows that it has reached the end of the consolidated payload if it has received an amount of data indicated in the last delimiter as the length of the last SDU. In an embodiment, the receiver knows whether or not an SDU is the last SDU of the consolidated payload by evaluating the sequence field of the last SDU's delimiter. In other embodiments, either or both the total length field in the PHY header or the sequence field in the delimiter can be excluded, and another way of determining the end of the consolidated payload can be used. For example, the receiver may measure the symbol energy to determine whether the end of the consolidated payload has been reached.

If the end of the consolidated payload has not yet been reached, the procedure iterates as shown. Specifically, the receiver evaluates the next delimiter-sized data segment, in block 610, and the procedure repeats.

If the end of the consolidated payload has been reached, the receiver delivers the various SDUs that it parsed from the consolidated payload, in block 624, and the method ends. In another embodiment, the receiver can deliver each SDU while the SDU is being received, or in parallel with receiving other SDUs.

Embodiments described above in conjunction with FIGS. 4-6 provide a high throughput method of burst-mode transmission with robust error detection and recovery. Throughput is improved from prior art methods by eliminating the IFS between SDUs, as well as by eliminating intervening preambles and PHY headers associated with SDUs that occur after the first SDU.

The length validation field enables robust error detection and recovery. First, the length validation field enables the receiver to determine whether the length field is corrupted in the delimiter. If the receiver determines that the length field is corrupted, the receiver can look at every byte that follows, to try to find a segment of data that appears to be a delimiter. If the receiver finds a segment of data that appears to be a delimiter, the receiver assumes that the data represents a delimiter, and the receiver re-synchronizes itself for receipt of the next SDU.

In an embodiment, the chance is very slim of the receiver finding a data segment that appears to be a delimiter, but is not. In an embodiment that includes a 2-byte CRC, the chance of incorrectly detecting a delimiter is approximately 1 in 65,000. Even if this occurs, the receiver will again detect an error when it does not find a valid delimiter at the end of the supposed SDU. And again, the receiver will search for a data segment that appears to be a delimiter. Therefore, even if a delimiter is corrupted, and another data segment coincidentally looks like a delimiter, the receiver eventually will recover when it finds a valid delimiter. Accordingly, this embodiment provides a robust method of error detection and recovery.

In another embodiment, the delimiter includes only a length field, and the length validation field is excluded. This embodiment works well when the channel is robust, and the delimiter's length field is highly unlikely to be corrupted. If the data in the length field is more likely to be corrupted, then the lack of a length validation field may make it more difficult for the receiver to recover from an error in the length validation field. The receiver may look for a next delimiter based on the corrupted length, and it would likely find only random data there, which would cause it to be even more difficult for the receiver to recover from the erroneous data.

Figure 7:
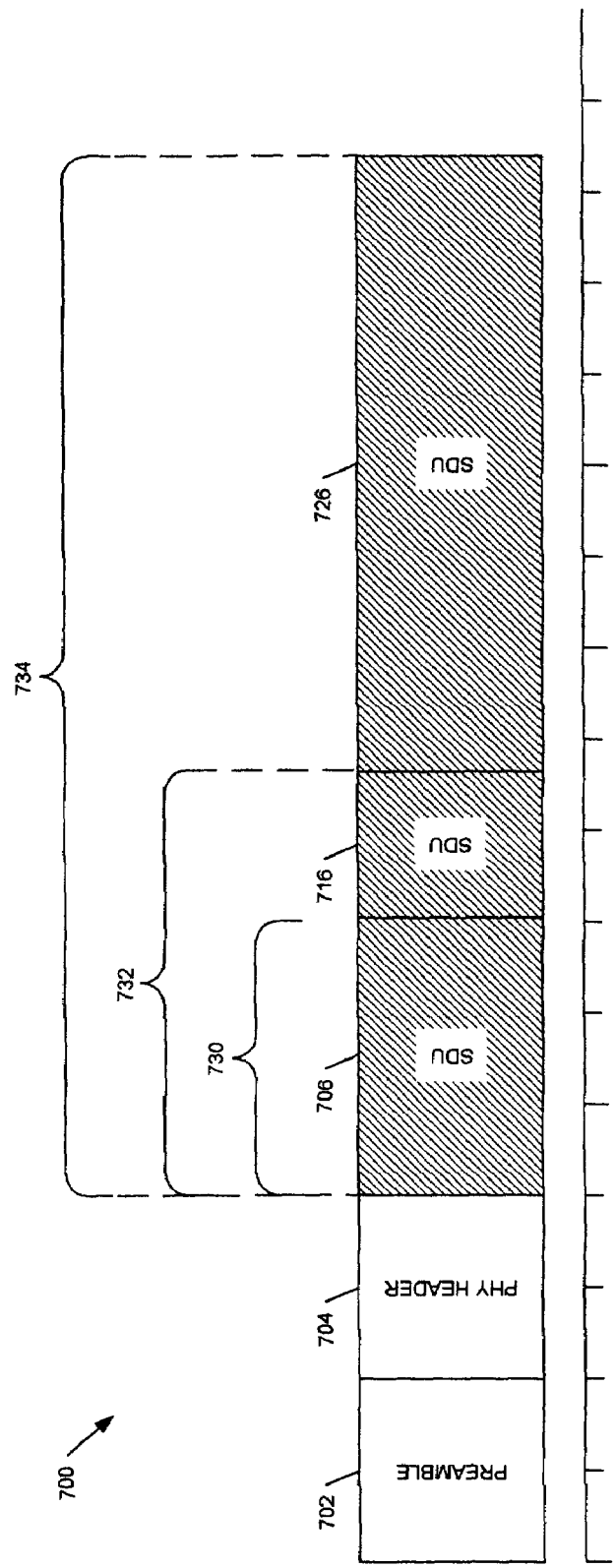
FIG. 7 illustrates an example of a timing diagram for transmitting a PPDU with multiple SDUs without intervening data in accordance with an embodiment of the inventive subject matter.
Figure 8:
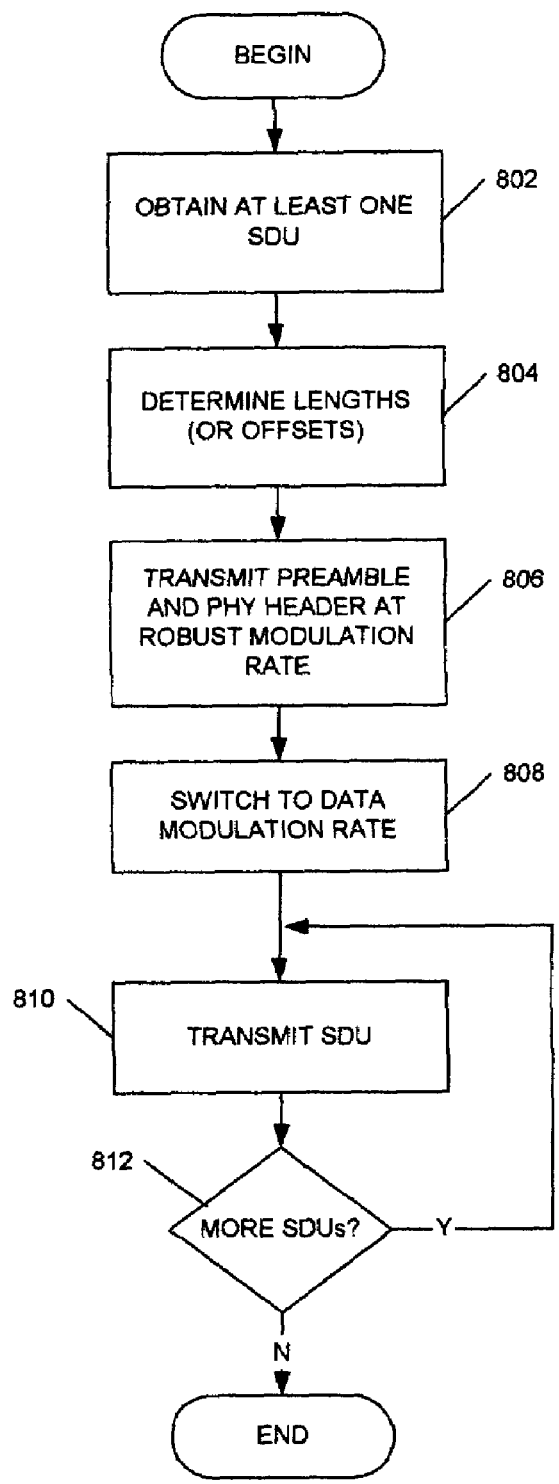
FIG. 8 is a flowchart of a procedure for a transmitter to assemble and transmit a PPDU, such as that illustrated in FIG. 7, in accordance with an embodiment of the inventive subject matter.

In an embodiment described in conjunction with FIGS. 6-8, the delimiter is transmitted at the data modulation rate. Although this may increase the chance that the delimiter's length field might become corrupted, the delimiter's length validation field enables robust error detection and recovery.

Figure 9:
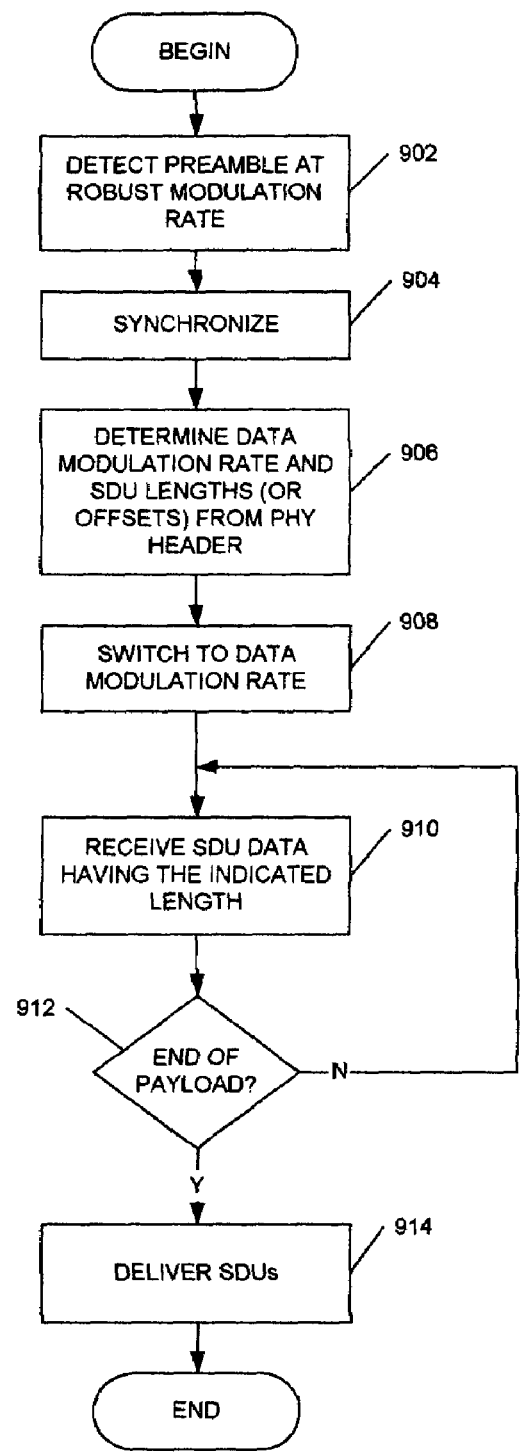
FIG. 9 is a flowchart of a procedure for a receiver to receive and divide a PPDU, such as that illustrated in FIG. 7, in accordance with an embodiment of the inventive subject matter.

In another embodiment, described in conjunction with FIGS. 7-9, the PPDU frame may include multiple SDUs, but the length of each SDU is included in the PHY header, and thus it is transmitted at the robust modulation rate. In this embodiment, the chance that the SDU length fields will be corrupted is less than it would be if the lengths were transmitted at the data modulation rate.

FIG. 7 illustrates an example of a timing diagram for transmitting a PPDU with multiple SDUs without intervening data in accordance with an embodiment of the inventive subject matter. The PPDU 700 includes a preamble 702, PHY header 704, and a consolidated payload with at least one SDU 706, 716, 726. In the illustrated example, the consolidated payload includes three SDUs. More or fewer SDUs can be included in a single consolidated payload.

The preamble 702 includes a pattern of bits, which the receiver uses to synchronize itself, as described above. The PHY header 704 includes a rate field, which indicates which data modulation rate is used for the consolidated payload. The PHY header 704 could have a fixed or variable length.

Each SDU 706, 716, 726 must be separated and delivered intact by the PHY in the receiver. To facilitate decomposition of the consolidated payload into individual SDUs, the PHY header 704 also includes a length/size field associated with each SDU 706, 716, 726 included in the consolidated payload, in an embodiment.

Each length/size field indicates the length of its associated SDU, in an embodiment. In another embodiment, the length/size field defines the aggregate length of the associated SDU and any preceding SDUs within the consolidated payload. Thus, the length of SDU 706 would be represented as the length 730 of SDU 706. The length of SDU 716 would be represented as the aggregate length 732 of SDU 706 and 716. Finally, the length of SDU 726 would be represented as the aggregate length 734 of SDUs 706, 716, and 726. In various embodiments, the length/size field can include a number of microseconds, a number of bytes, or some other value indicating length.

The values in the length/size fields enable the receiver to determine where one SDU ends, and another begins. Accordingly, in yet another embodiment, the length/size field can instead include an "offset" value, which indicates the magnitude of an offset into the consolidated payload where the beginning of the next SDU occurs (or where the end of a previous SDU occurs).

FIG. 8 is a flowchart of a procedure for a transmitter to assemble and transmit a PPDU, such as that illustrated in FIG. 7, in accordance with an embodiment of the inventive subject matter. The method begins, in block 802 when the PHY device obtains at least one SDU. In one embodiment, the SDUs are intermediately or finally destined for the same receiver, although it is possible for the SDUs to have different destinations.

In block 804, the lengths (or offsets) associated with each SDU are determined. The lengths can be the individual length of each SDU, or the aggregate length of each SDU within the consolidated payload. For example, in an embodiment, the SDU length is represented by two bytes. In other embodiments the length field can be larger or smaller. In still other embodiments, an offset value can be used to enable a determination of the end of one SDU and the beginning of a next SDU, rather than using a length value.

Each of the lengths or offsets is included in the PHY header. Accordingly, if the consolidated payload includes three SDUs, the PHY header would include at least three length fields. In one embodiment, the PHY header is fixed in size, which limits the number of SDUs that the PHY header may describe. In another embodiment, the PHY header has a variable size. In such an embodiment, the PHY header may include information that enables a determination of how many SDUs the PHY header describes and/or the length of the PHY header.

After negotiating access to the air interface, the transmitter transmits the preamble and the PHY header over the air at the robust modulation rate, in block 806. In an embodiment, the transmitter begins transmitting each of the preamble and the PHY header at the beginning of a symbol boundary. In an embodiment, the preamble is transmitted for two symbols, and the PHY header is transmitted for one symbol. In other embodiments, either the preamble or the PHY header can be transmitted for longer or shorter time durations.

When transmission of the PHY header is complete, the transmitter switches to the data modulation rate, in block 808. The transmitter begins transmitting the first SDU, in block 810. In an embodiment, the transmitter begins transmitting the first SDU at the beginning of the next symbol boundary after completion of the PHY header. Alternatively, the first SDU can begin at a time other than a symbol boundary. In other words, transmission can begin before or after a symbol boundary. In an embodiment, the transmitter begins transmitting the consolidated payload within one symbol width of the end of the PHY header. Internal block padding may be included at the end of each SDU.

In block 812, a determination is made whether more SDUs remain to be transmitted. If more SDUs remain to be transmitted, the transmitter begins transmitting the next SDU, in block 810. In an embodiment, the transmitter begins transmitting the next SDU immediately upon completion of transmitting the previous SDU, whether or not that position within the payload occurs on a symbol boundary. Accordingly, in this embodiment, all of the data within the consolidated payload is efficiently concatenated together. In other embodiments, gaps or filler data can exist between subsequent SDUs. After transmitting the last SDU, the method ends.

FIG. 9 is a flowchart of a procedure for a receiver to receive and divide a PPDU, such as that illustrated in FIG. 7, in accordance with an embodiment of the inventive subject matter. The method begins, in block 902, when the receiver detects an incoming preamble at the robust modulation rate. The receiver uses the preamble to become synchronized with the incoming PPDU frame, in block 904.

In one embodiment, the receiver determines the modulation rate of the PPDU's consolidated payload from the PHY header, in block 906. In an alternate embodiment, the data modulation rate may be determined in a prior training exchange.

In an embodiment, the receiver also determines the lengths or offsets associated with each SDU in the consolidated payload from the PHY header. This enables the receiver to know where the SDU boundaries occur, and how long it should demodulate incoming data at the data modulation rate. Once receipt of the PHY header has completed, the receiver switches to demodulating at the data modulation rate, in block 908.

In block 910, the receiver receives and stores an amount of SDU data with a length as indicated in the associated length field for the SDU in the PHY header. A determination is made, in block 912, whether the end of the consolidated payload has been reached. In an embodiment, the receiver knows that it has reached the end of the consolidated payload if it has received an amount of data that corresponds to the length field for the last SDU provided in the PHY header, whether that length field indicates the length of the last SDU separately, or whether that length field indicates the aggregate length. In an alternate embodiment, the receiver may determine that the end of the payload has been reached using a measurement of symbol energy.

If the end of the consolidated payload has not yet been reached, the procedure iterates as shown. Specifically, the receiver receives and stores the next SDU, in block 910, and the procedure repeats.

If the end of the consolidated payload has been reached, in block 914, the receiver delivers the various SDUs that it parsed from the consolidated payload, and the method ends.

In another embodiment, the receiver can deliver each SDU while the SDU is being received, or in parallel with receiving other SDUs.

In embodiments described in conjunction with FIGS. 7-9, no preambles or PHY headers are transmitted between SDUs. Accordingly, it is not necessary for the receiver to switch back and forth between the data modulation rate and the robust modulation rate while the receiver is receiving the consolidated payload. In another embodiment, illustrated in conjunction with FIGS. 10-12, a preamble and PHY header are transmitted for each SDU. However, the transmitter does not wait for the IFS before transmitting subsequent PPDU frames that are intermediately or finally destined for the same receiver. Instead, the transmitter begins transmitting the next PPDU frame at the next symbol boundary after completion of a previous frame.

Figure 10:
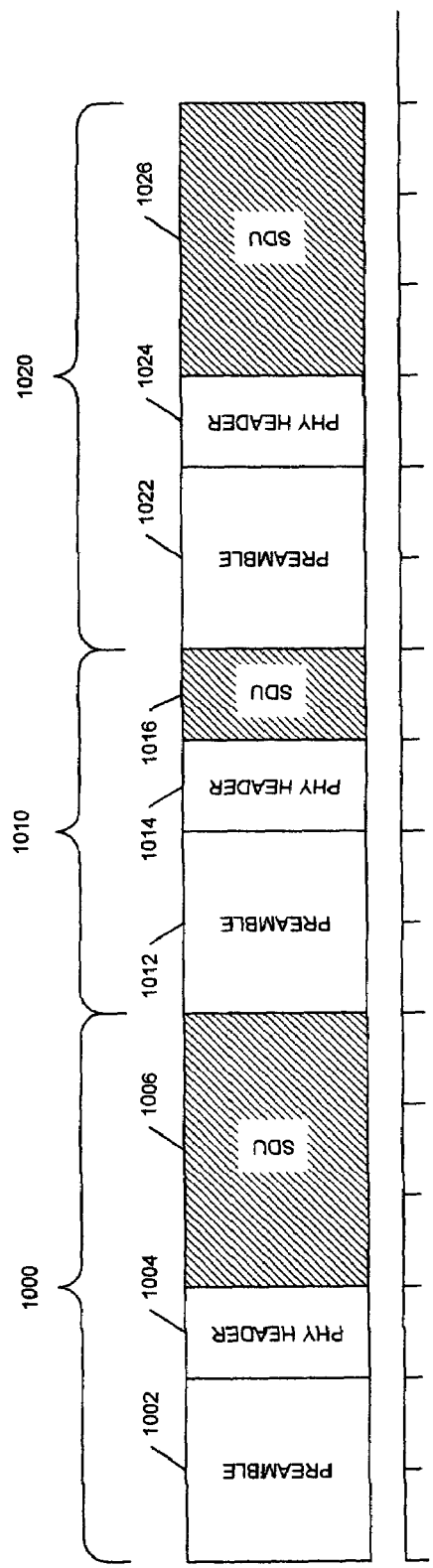
FIG. 10 illustrates an example of a timing diagram for transmitting a burst of multiple PPDUs in accordance with an embodiment of the inventive subject matter.

FIG. 10 illustrates an example of a timing diagram for transmitting multiple PPDUs in accordance with an embodiment of the inventive subject matter. Each PPDU 1000, 1010, 1020 includes a preamble 1002, 1012, 1022, PHY header 1004, 1014, 1024, and an SDU 1006, 1016, 1026. In the illustrated example, three concatenated PPDUs are shown. More or fewer PPDUs can be sent in accordance with embodiments described in conjunction with FIGS. 10-12.

Each preamble 1002, 1012, 1022 includes a pattern of bits, which the receiver uses to synchronize itself, as described above. Each PHY header 1004, 1014, 1024 includes a rate field, which indicates which data modulation rate is used for the payload. The data modulation rate may or may not be the same for each payload. In addition, each PHY header 1004, 1014, 1024 includes a length/size field for the SDU 1006, 1016, 1026 that follows it. The lengths of the payloads may or may not be the same. Each length/size field indicates the length of its associated SDU, in an embodiment. In various embodiments, the length/size field can include a number of microseconds, a number of bytes, or some other value indicating length. The PHY header 1004 could have a fixed or variable length.

Figure 11:
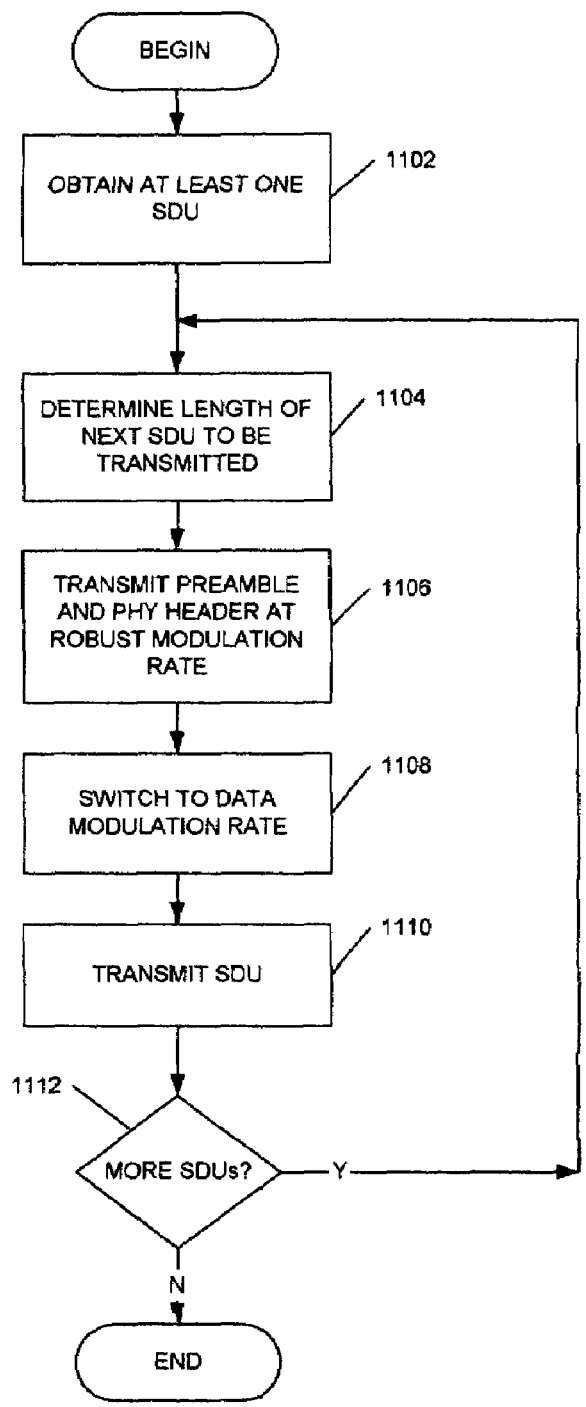
FIG. 11 is a flowchart of a procedure for a transmitter to transmit a burst of multiple PPDUs, such as those illustrated in FIG. 10, in accordance with an embodiment of the inventive subject matter.

FIG. 11 is a flowchart of a procedure for a transmitter to transmit a burst of multiple PPDUs, such as those illustrated in FIG. 10, in accordance with an embodiment of the inventive subject matter. The method begins, in block 1102 when the PHY device obtains at least one SDU. In one embodiment, the SDUs are intermediately or finally destined for the same receiver, although it is possible for the SDUs to have different destinations.

In block 1104, the length associated with the next SDU to be transmitted is determined. For example, in an embodiment, the SDU length is represented by two bytes. In other embodiments the length field can be larger or smaller. The length is included in the PHY header for that SDU.

After negotiating access to the air interface, the transmitter transmits the preamble and the PHY header for the SDU over the air at the robust modulation rate, in block 1106. In an embodiment, the transmitter begins transmitting each of the preamble and the PHY header at the beginning of a symbol boundary. In an embodiment, the preamble is transmitted for two symbols, and the PHY header is transmitted for one symbol. In other embodiments, either the preamble or the PHY header can be transmitted for longer or shorter time durations.

When transmission of the PHY header is complete, the transmitter switches to the data modulation rate, in block 1108. The transmitter begins transmitting the first SDU, in block 1110. In an embodiment, the transmitter begins transmitting the first SDU at the beginning of the next symbol boundary after completion of the PHY header. Alternatively, the first SDU can begin at a time other than a symbol boundary. In other words, transmission can begin before or after a symbol boundary. Although not illustrated in FIG. 11, the last symbol in which an SDU is transmitted can be only partially used. In such a case, a gap may exist between the end of the SDU and the beginning of the next symbol boundary. In addition, internal block padding may be included at the end of each SDU.

In block 1112, a determination is made whether more SDUs remain to be transmitted. If more SDUs remain to be transmitted, then the procedure iterates as shown. Specifically, the transmitter prepares and transmits the next preamble, PHY header, and SDU.

In an embodiment, the transmitter begins transmitting the preamble for the next PPDU at the beginning of the next symbol boundary after completion of the previous SDU. Alternatively, the next PPDU can begin at a time other than a symbol boundary. In other words, transmission can begin before or after a symbol boundary. After transmitting the last SDU, the method ends.

Figure 12:
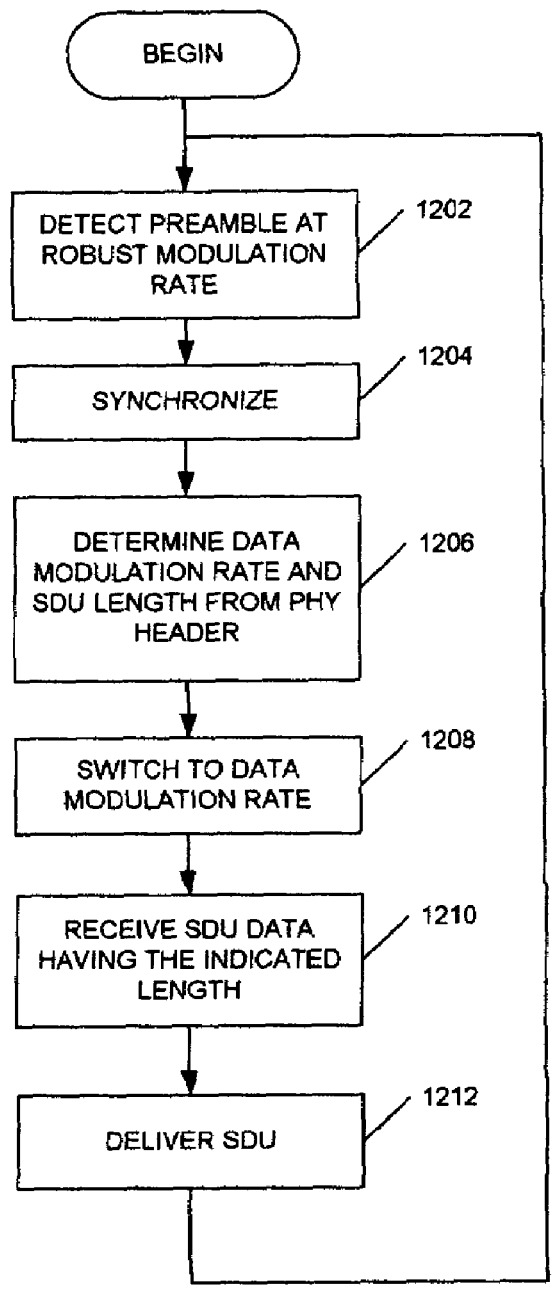
FIG. 12 is a flowchart of a procedure for a receiver to receive a burst of multiple PPDUs, such as those illustrated in FIG. 10, in accordance with an embodiment of the inventive subject matter.

FIG. 12 is a flowchart of a procedure for a receiver to receive a burst of multiple PPDUs, such as those illustrated in FIG. 10, in accordance with an embodiment of the inventive subject matter. The method begins, in block 1202, when the receiver detects an incoming preamble at the robust modulation rate. The receiver uses the preamble to become synchronized with the incoming PPDU frame, in block 1204.

In one embodiment, the receiver determines the modulation rate of the PPDU's payload from the PHY header, in block 1206. In another embodiment, the data modulation rate may be determined during a prior training exchange.

The receiver also determines the length of the associated SDU from the PHY header, in one embodiment. Once receipt of the PHY header has completed, the receiver switches to demodulating at the data modulation rate, in block 1208.

In block 1210, the receiver receives and stores an amount of SDU data with a length as indicated in the associated length field for the SDU in the PHY header. In an alternate embodiment, the receiver may determine that the end of the payload has been reached using a measurement of symbol energy.

When the end of the SDU has been reached, in block 1212, the receiver delivers the SDU. In another embodiment, the receiver can begin delivery of the SDU while the SDU is being received. The procedure then iterates as shown, by the receiver attempting to detect a preamble at the robust modulation rate, in block 1202.

In embodiments described in conjunction with FIGS. 10-12, a full-length preamble and PHY header is transmitted between SDUs. In another embodiment, illustrated in conjunction with FIGS. 13-15, a full-length preamble is transmitted for the first PPDU frame, and partial preambles are transmitted for subsequent PPDU frames.

Figure 13:
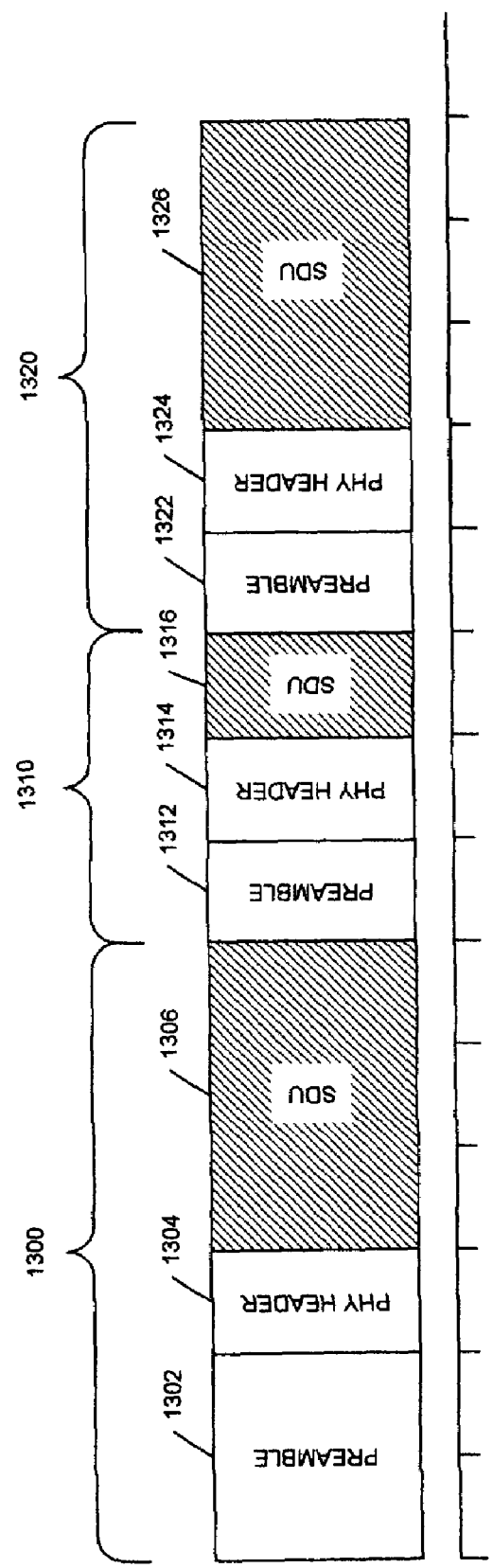
FIG. 13 illustrates an example of a timing diagram for transmitting a burst of multiple PPDUs with shortened intervening preambles in accordance with an embodiment of the inventive subject matter.

FIG. 13 illustrates an example of a timing diagram for transmitting a burst of multiple PPDUs with shortened intervening preambles in accordance with an embodiment of the inventive subject matter. The first PPDU 1300 includes a full-length preamble 1302, and subsequent PPDUs 1310, 1320 in the burst include partial preambles 1312, 1322, in an embodiment.

The full-length preamble 1302 includes a pattern of bits, which the receiver uses to synchronize itself. Specifically, the receiver may use the preamble 1302 to perform the following tasks: 1) packet start acquisition; 2) channel estimation; 3) antenna diversity and training; 4) receiver automatic gain control (AGC); 5) carrier offset; and 6) symbol timing. In an embodiment, all of these tasks, except for packet start acquisition, can be performed once at the start of the burst. For subsequent PPDUs after the first PPDU of the burst, a partial preamble 1312, 1322 is transmitted. The partial preamble 1312, 1322 may be used by the receiver to perform a packet start acquisition task.

In an embodiment, each PPDU 1300, 1310, 1320 also includes a PHY header 1304, 1314, 1324, and an SDU 1306, 1316, 1326. Each PHY header 1304, 1314, 1324 includes a rate field, in one embodiment, which indicates which data modulation rate is used for the payload. In another embodiment, the data modulation rate could be determined during a training exchange.

In addition, each PHY header 1304, 1314, 1324 includes a length/size field for the SDU 1306, 1316, 1326 that follows it. Each length/size field indicates the length of its associated SDU, in an embodiment. In various embodiments, the length/size field can include a number of microseconds, a number of bytes, or some other value indicating length. In the illustrated example, three concatenated PPDUs are shown. More or fewer PPDUs can be sent in accordance with embodiments described in conjunction with FIGS. 13-15. The PHY header 1304 could have a fixed or variable length.

Figure 14:
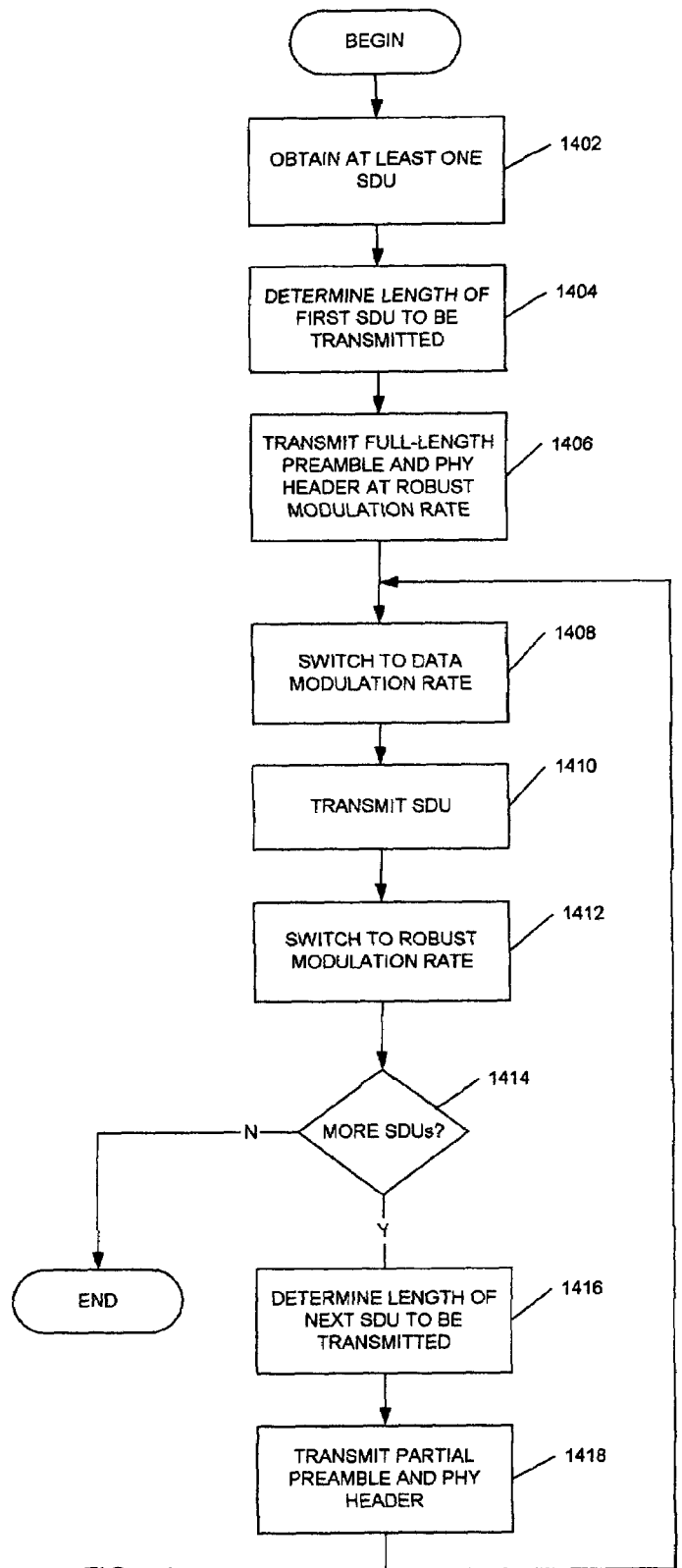
FIG. 14 is a flowchart of a procedure for a transmitter to transmit a burst of multiple PPDUs, such as those illustrated in FIG. 13, in accordance with an embodiment of the inventive subject matter.

FIG. 14 is a flowchart of a procedure for a transmitter to transmit a burst of multiple PPDUs, such as those illustrated in FIG. 13, in accordance with an embodiment of the inventive subject matter. The method begins, in block 1402 when the PHY device obtains at least one SDU. In one embodiment, the SDUs are intermediately or finally destined for the same receiver, although it is possible for the SDUs to have different destinations.

In block 1404, the length associated with the next SDU to be transmitted is determined. For example, in an embodiment, the SDU length is represented by two bytes. In other embodiments the length field can be larger or smaller. The length is included in the PHY header for that SDU.

After negotiating access to the air interface, the transmitter transmits a full-length preamble and the PHY header for the SDU over the air at the robust modulation rate, in block 1406. In an embodiment, the transmitter begins transmitting each of the full-length preamble and the PHY header at the beginning of a symbol boundary. In an embodiment, the full-length preamble is transmitted for two symbols, and the PHY header is transmitted for one symbol. In other embodiments, either the full-length preamble or the PHY header can be transmitted for longer or shorter time durations.

When transmission of the PHY header is complete, the transmitter switches to the data modulation rate, in block 1408. The transmitter begins transmitting the first SDU, in block 1410. In an embodiment, the transmitter begins transmitting the first SDU at the beginning of the next symbol boundary after completion of the PHY header. Alternatively, the first SDU can begin at a time other than a symbol boundary. In other words, transmission can begin before or after a symbol boundary. Although not illustrated in FIG. 14, the last symbol in which an SDU is transmitted can be only partially used. In such a case, a gap may exist between the end of the SDU and the beginning of the next symbol boundary. In addition, internal block padding may be included at the end of each SDU.

In block 1412, the transmitter switches back to the robust modulation rate, so that it will be ready to transmit the next preamble. In block 1414, a determination is made whether more SDUs remain to be transmitted. In another embodiment, this determination can be excluded. If more SDUs remain to be transmitted, the transmitter determines the length of the next SDU to be transmitted, in block 1416.

The transmitter begins transmitting a partial preamble and the PHY header for the SDU over the air at the robust modulation rate, in block 1418. In an embodiment, the partial preamble is transmitted for one symbol, and the PHY header is transmitted for one symbol. In other embodiments, either the partial preamble or the PHY header can be transmitted for longer or shorter time durations. In an embodiment, the transmitter begins transmitting the partial preamble for the next PPDU at the beginning of the next symbol boundary after completion of the previous SDU. Alternatively, the next PPDU can begin at a time other than a symbol boundary. In other words, transmission can begin before or after a symbol boundary.

After transmitting the partial preamble and PHY header, the method iterates as shown. Specifically, the transmitter switches back to the data modulation rate, and transmits the next SDU. After all SDUs in the burst have been transmitted, the method ends.

Figure 15:
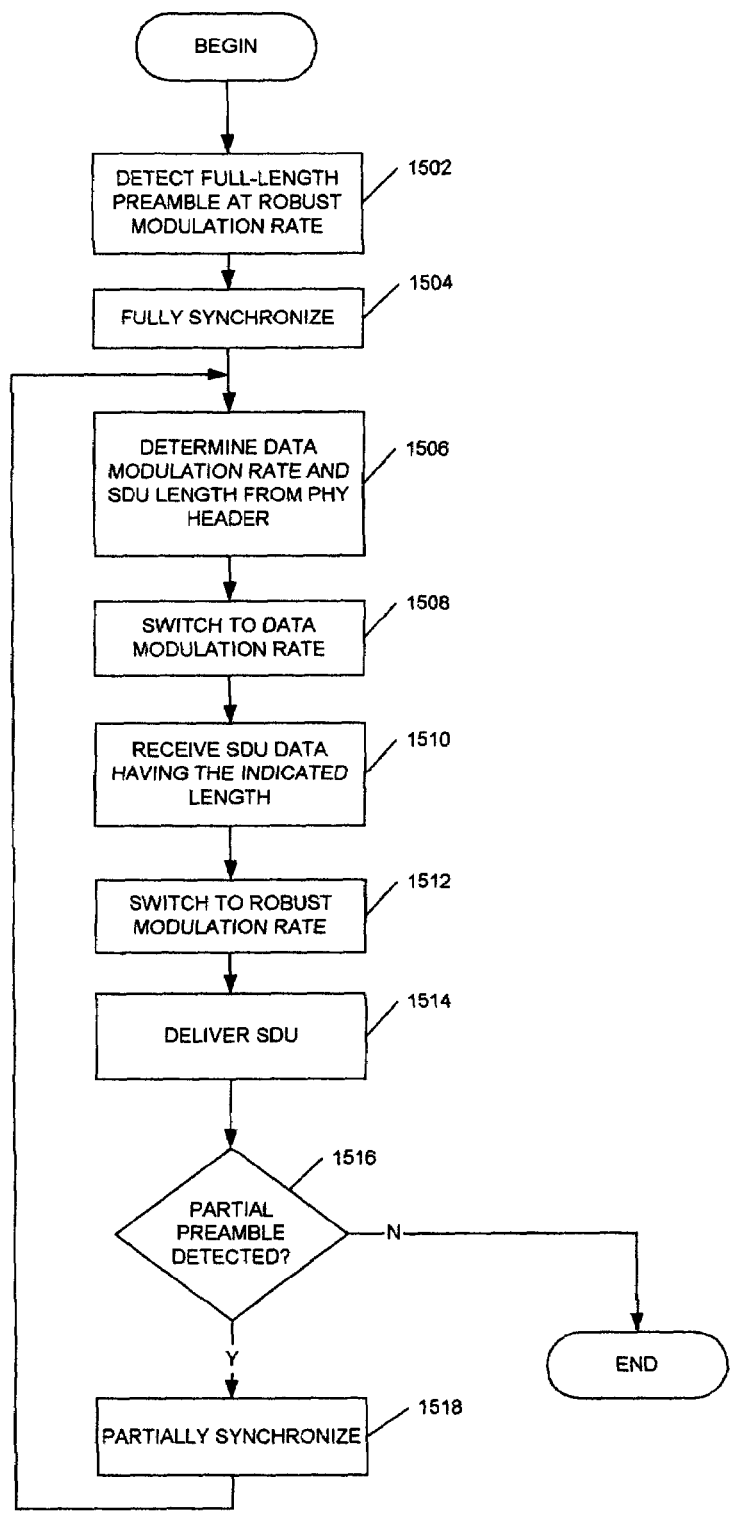
FIG. 15 is a flowchart of a procedure for a receiver to receive a burst of multiple PPDUs, such as those illustrated in FIG. 13, in accordance with an embodiment of the inventive subject matter.

FIG. 15 is a flowchart of a procedure for a receiver to receive a burst of multiple PPDUs, such as those illustrated in FIG. 13, in accordance with an embodiment of the inventive subject matter. The method begins, in block 1502, when the receiver detects an incoming, full-length preamble at the robust modulation rate. The receiver uses the preamble to become fully synchronized with the incoming PPDU frame, in block 1504. As described previously, full synchronization includes the tasks of: 1) packet start acquisition; 2) channel estimation; 3) antenna diversity and training; 4) receiver automatic gain control (AGC); 5) carrier offset; and 6) symbol timing. In other embodiments, more, fewer or different tasks can be performed during a full synchronization.

In one embodiment, the receiver determines the modulation rate of the PPDU's payload from the PHY header, in block 1506. In another embodiment, the data modulation rate may be determined during a prior training exchange.

The receiver also determines the length of the associated SDU from the PHY header, in one embodiment. Once receipt of the PHY header has completed, the receiver switches to demodulating at the data modulation rate, in block 1508.

In block 1510, the receiver receives and stores an amount of SDU data with a length as indicated in the associated length field for the SDU in the PHY header. In an alternate embodiment, the receiver may determine that the end of the payload has been reached using a measurement of symbol energy.

When the end of the SDU has been reached, the receiver switches back to the robust modulation rate, in block 1512, so that it will be ready to receive the next incoming preamble. In addition, in block 1514, the receiver delivers the SDU. In another embodiment, the receiver can begin delivery of the SDU while the SDU is being received.

After receipt of the first SDU is completed, the receiver determines whether a partial preamble is detected, in block 1516. If no partial preamble is detected within an amount of time, the receiver can assume that the burst is complete, and the procedure ends.

If a partial preamble is detected, the receiver uses the partial preamble to perform a partial synchronization process, in block 1518. In an embodiment, this involves performing at least the task of packet start acquisition. Because at least one of the other previously-performed synchronization tasks need not be repeated, the receiver will take significantly less time to synchronize with the upcoming PPDU, and the partial preamble can be significantly shorter than the full-length preamble. In other embodiments, the partial preamble can be used by the receiver to perform more or other tasks. After partially synchronizing itself, in block 1518, the procedure iterates as shown. Specifically, the receiver receives and processes the PHY header and SDU for the PPDU associated with the partial preamble.

In embodiments described in conjunction with FIGS. 13-15, a partial preamble and a PHY header are transmitted between SDUs. In another embodiment, illustrated in conjunction with FIGS. 16-18, only a PHY header is transmitted between SDUs, and the intervening preambles are excluded. Although a preamble is helpful in performing the task of packet start acquisition, it is possible to acquire the start of a packet even after loss of structural information by entering a PHY header search mode, which will be described in more detail in conjunction with FIG. 18, in an embodiment. Accordingly, acceptable synchronization, error detection, and error recovery may be possible even without intervening preambles between SDUs.

Figure 16:
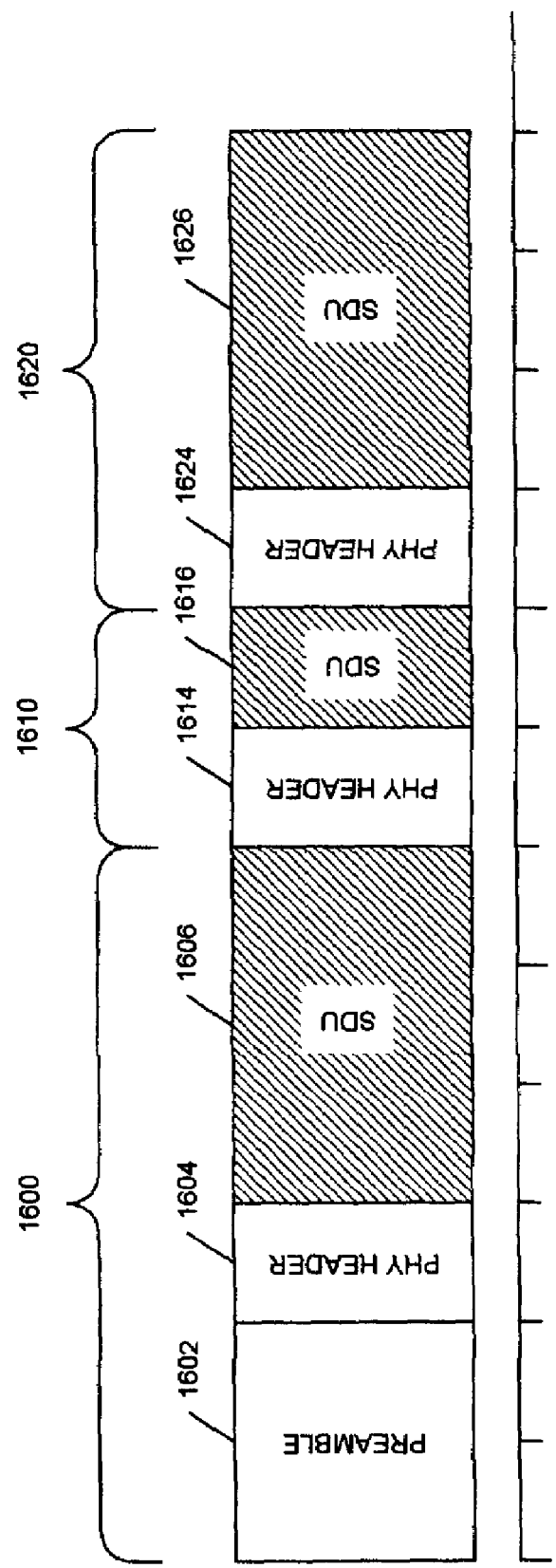
FIG. 16 illustrates an example of a timing diagram for transmitting a burst of multiple PPDUs without intervening preambles, in accordance with an embodiment of the inventive subject matter.

FIG. 16 illustrates an example of a timing diagram for transmitting a burst of multiple PPDUs without intervening preambles in accordance with an embodiment of the inventive subject matter. The first PPDU 1600 includes a preamble 1602. The preamble 1602 includes a pattern of bits, which the receiver uses to synchronize itself. Subsequent PPDUs 1610, 1620 in the burst do not include preambles, in an embodiment.

In an embodiment, each PPDU 1600, 1610, 1620 includes a PHY header 1604, 1614, 1624, and an SDU 1606, 1616, 1626. Each PHY header 1604, 1614, 1624 includes a rate field, in one embodiment, which indicates which data modulation rate is used for the payload. In another embodiment, the data modulation rate can be determined during a training exchange.

In addition, each PHY header 1604, 1614, 1624 includes a length/size field for the SDU 1606, 1616, 1626 that follows it. Each length/size field indicates the length of its associated SDU, in an embodiment. Accordingly, the length/size field enables the receiver to determine when the end of the SDU will occur, and to predict when the beginning of the next PHY header in the burst should occur. In various embodiments, the length/size field can include a number of microseconds, a number of bytes, or some other value indicating length. In the illustrated example, three concatenated PPDUs are shown. More or fewer PPDUs can be sent in accordance with embodiments described in conjunction with FIGS. 16-18. The PHY header 1604 could have a fixed or variable length.

Figure 17:
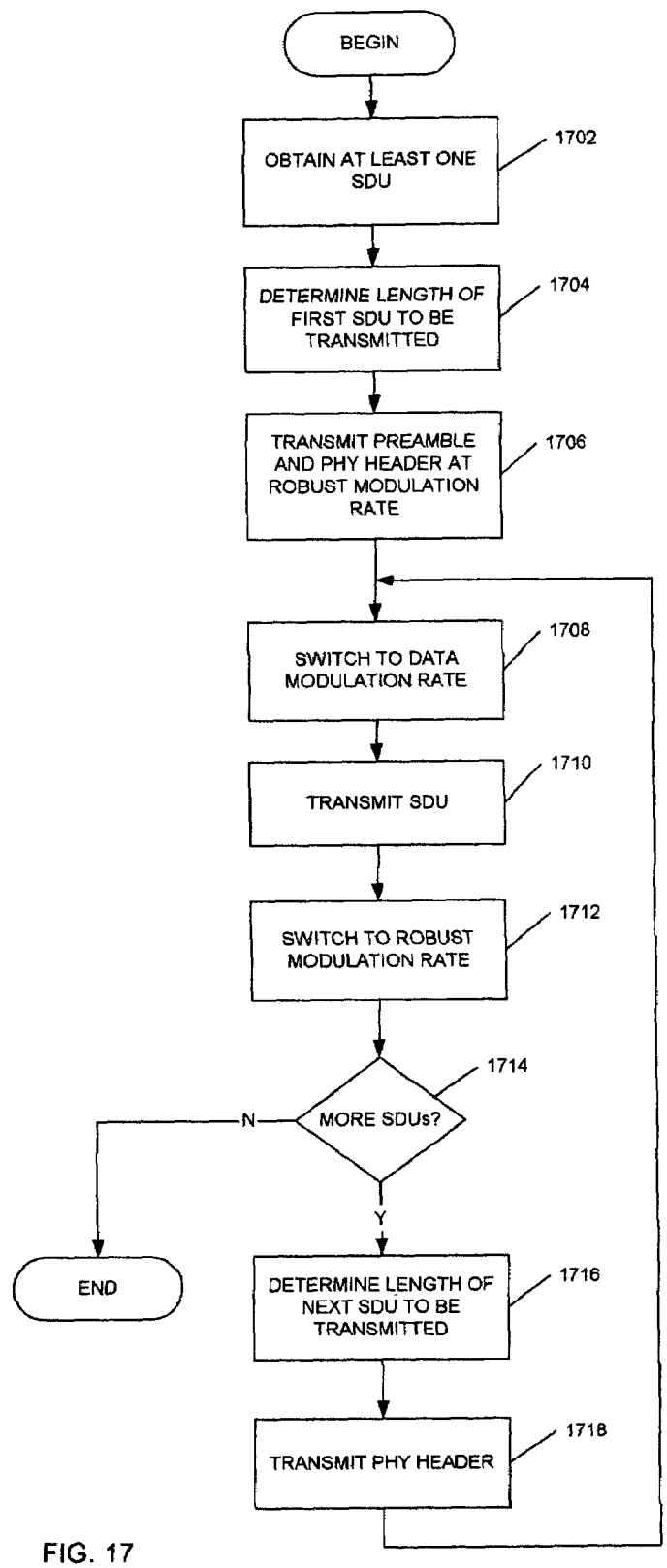
FIG. 17 is a flowchart of a procedure for a transmitter to transmit a burst of multiple PPDUs, such as those illustrated in FIG. 16, in accordance with an embodiment of the inventive subject matter.

FIG. 17 is a flowchart of a procedure for a transmitter to transmit a burst of multiple PPDUs, such as those illustrated in FIG. 16, in accordance with an embodiment of the inventive subject matter. The method begins, in block 1702 when the PHY device obtains at least one SDU. In one embodiment, the SDUs are intermediately or finally destined for the same receiver, although it is possible for the SDUs to have different destinations.

In block 1704, the length associated with the first SDU to be transmitted is determined. For example, in an embodiment, the SDU length is represented by two bytes. In other embodiments the length field can be larger or smaller. The length is included in the PHY header for that SDU.

After negotiating access to the air interface, the transmitter transmits a preamble and the PHY header for the SDU over the air at the robust modulation rate, in block 1706. In an embodiment, the transmitter begins transmitting each of the preamble and the PHY header at the beginning of a symbol boundary. In an embodiment, the preamble is transmitted for two symbols, and the PHY header is transmitted for one symbol. In other embodiments, either the preamble or the PHY header can be transmitted for longer or shorter time durations.

When transmission of the PHY header is complete, the transmitter switches to the data modulation rate, in block 1708. The transmitter begins transmitting the first SDU, in block 1710. In an embodiment, the transmitter begins transmitting the first SDU at the beginning of the next symbol boundary after completion of the PHY header. Alternatively, the first SDU can begin at a time other than a symbol boundary. In other words, transmission can begin before or after a symbol boundary. Although not illustrated in FIG. 17, the last symbol in which an SDU is transmitted can be only partially used. In such a case, a gap may exist between the end of the SDU and the beginning of the next symbol boundary. In addition, internal block padding may be included at the end of each SDU.

In block 1712, the transmitter switches back to the robust modulation rate, so that it will be ready to transmit the next PHY header. In block 1714, a determination is made whether more SDUs remain to be transmitted. In another embodiment, this determination can be excluded. If more SDUs remain to be transmitted, the transmitter determines the length of the next SDU to be transmitted, in block 1716.

The transmitter begins transmitting the PHY header for the SDU over the air at the robust modulation rate, in block 1718. In an embodiment, the PHY header is transmitted for one symbol. In other embodiments, the PHY header can be transmitted for longer or shorter time durations. In an embodiment, the transmitter begins transmitting the PHY header for the next PPDU at the beginning of the next symbol boundary after completion of the previous SDU. Alternatively, the next PPDU can begin at a time other than a symbol boundary. In other words, transmission can begin before or after a symbol boundary.

After transmitting the PHY header, the method iterates as shown. Specifically, the transmitter switches back to the data modulation rate, and transmits the next SDU. After all SDUs in the burst have been transmitted, the method ends.

Figure 18:
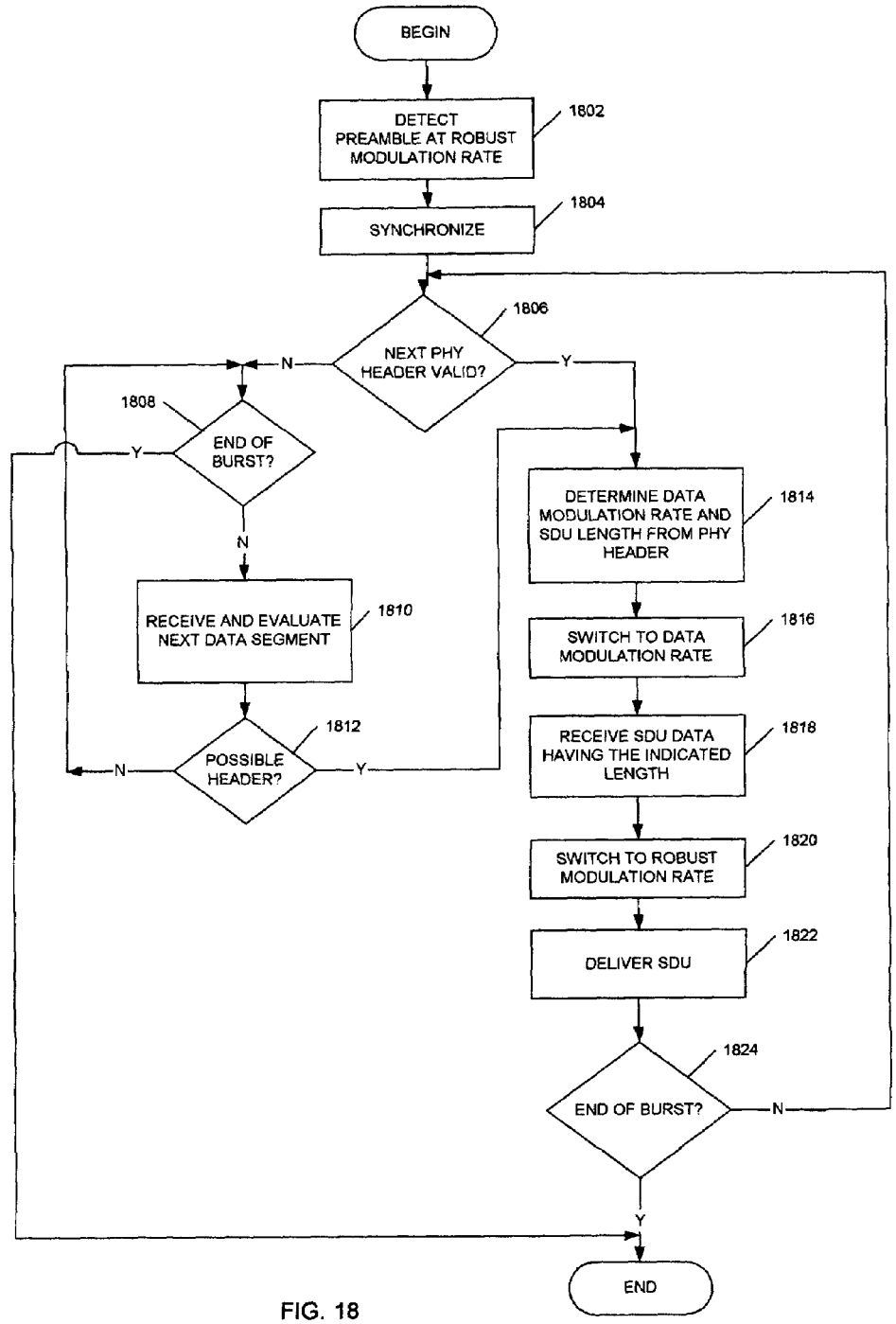
FIG. 18 is a flowchart of a procedure for a receiver to receive a burst of multiple PPDUs, such as those illustrated in FIG. 16, in accordance with an embodiment of the inventive subject matter.

FIG. 18 is a flowchart of a procedure for a receiver to receive a burst of multiple PPDUs, such as those illustrated in FIG. 16, in accordance with an embodiment of the inventive subject matter. The method begins, in block 1802, when the receiver detects an incoming preamble at the robust modulation rate. The receiver uses the preamble to become synchronized with the incoming PPDU frame, in block 1804.

At the next symbol boundary after the end of the preamble, the receiver should begin receiving a PHY header. Therefore, the receiver receives and attempts to validate a segment of data having the size of a PHY header. In an embodiment, the PHY header size is one symbol width.

Validation is performed by determining if a data integrity field within the PHY header correlates with the data in the PHY header. In an embodiment, the data integrity field includes a checksum or CRC, which enables the receiver to determine whether the data is corrupted or uncorrupted.

A determination is made, in block 1806, whether the PHY header-sized data segment includes what appears to be a valid PHY header. If not, then the receiver transitions to a PHY header search mode, indicated by blocks 1808, 1810, and 1812. In this mode, the receiver determines whether the end of the burst may have been reached, in block 1808. In various embodiments, the end of the burst can be determined if no PHY header is detected within an amount of time, or if a known end point has been reached, or if the symbol energy drops below a threshold. If the end of the burst has been reached, the method ends.

If the end of the burst has not been reached, then the receiver receives and evaluates each subsequent PHY header-sized segment of data, in block 1810. Subsequent segments can be overlapping or sequential.

A determination is made, in block 1812, whether the next PHY header-sized segment of data appears to be a possible PHY header by validating what can be the header data with what can be the header integrity field. If the PHY header-sized segment of data does not appear to be a possible PHY header, then the procedure iterates. When a possible PHY header is detected, the receiver discontinues the PHY header search mode.

When the PHY header search mode is exited, or when the next PHY header has been validated, the receiver determines the modulation rate of the PPDU's payload from the PHY header, in block 1814, in one embodiment. In another embodiment, the data modulation rate may be determined during a prior training exchange.

The receiver also determines the length of the associated SDU from the PHY header, in one embodiment. Once receipt of the PHY header has completed, the receiver switches to demodulating at the data modulation rate, in block 1816.

In block 1818, the receiver receives and stores an amount of SDU data with a length as indicated in the associated length field for the SDU in the PHY header. In an alternate embodiment, the receiver may determine that the end of the payload has been reached using a measurement of symbol energy.

When the end of the SDU has been reached, the receiver switches back to the robust modulation rate, in block 1820, so that it will be ready to receive the next incoming PHY header. In addition, in block 1822, the receiver delivers the SDU. In another embodiment, the receiver can begin delivery of the SDU while the SDU is being received.

After receipt of the first SDU is completed, the receiver determines whether the end of the burst has occurred, in block 1824. If no PHY header is detected within an amount of time, or if a known end point has been reached, or if the symbol energy drops below a threshold, the receiver can assume that the burst is complete, and the procedure ends. If a PHY header is detected, the procedure iterates as shown. Specifically, the receiver receives and processes the PHY header and SDU for the next PPDU.

An embodiment described above in conjunction with FIGS. 16-18 provides a high throughput method of burst-mode transmission with robust error detection and recovery. Throughput is improved from prior art methods by eliminating the IFS and the preambles between SDUs.

The header integrity field of the PHY header enables robust error detection and recovery. If the receiver determines that PHY data is corrupted, which can indicate an out of sync condition, the receiver can look at every byte that follows, to try to find a segment of data that appears to be a PHY header. If the receiver finds a segment of data that appears to be a PHY header, the receiver assumes that the data represents a PHY header, and the receiver re-synchronizes itself for receipt of the next SDU.

Thus, various embodiments of a method, apparatus, and system have been described which enable higher throughput data burst transmissions. The foregoing description of specific embodiments reveals the general nature of the inventive subject matter sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the inventive subject matter embraces all such alternatives, modifications, equivalents and variations as fall within the spirit and broad scope of the appended claims.

The operations described above, with respect to the methods illustrated and described herein, can be performed in a different order from that disclosed. Also, it will be understood that, although some methods are described as having an "end," they may be continuously performed.

Although embodiments, above, have been described in conjunction with an 802.11 Standard, embodiments can be implemented in conjunction with other standards that have fully or partially "self-describing" frames. In other words, embodiments are not meant to be limited to methods, systems, and devices that implement an 802.11 Standard.

The various procedures described herein can be implemented in hardware, firmware or software. A software implementation can use microcode, assembly language code, or a higher-level language code. The code may be stored on one or more volatile or non-volatile computer-readable media during execution or at other times. These computer-readable media may include hard disks, removable magnetic disks, removable optical disks, magnetic cassettes, flash memory cards, digital video disks, Bernoulli cartridges, random access memories (RAMs), read only memories (ROMs), and the like.

Embodiments of the inventive subject matter may pertain to any of a variety of types of PHY layers that support an IEEE Std 802.11 and other WLAN standards, including but not limited to, infrared (IR) baseband PHY, frequency hopping spread spectrum (FHSS) radios (e.g., in the 2.4 GHz band), direct sequence spread spectrum (DSSS) radios (e.g., in the 2.4 GHz band), orthogonal frequency domain multiplexing (OFDM) radios (e.g., in the UNII bands), and other types of PHY layers for which IEEE Std 802.11 and other WLAN standards are being extended to now and in the future. Further, embodiments of the inventive subject matter can be used in conjunction with any IEEE Std 802.11, including IEEE Std 802.11-1997, 802.11a, 802.11b, 802.11e, other variants of the IEEE Std 802.11 existing or being developed now or in the future, and other WLAN standards besides IEEE Std 802.11.

In the claims, the terms "first modulation rate" and "second modulation rate" are used. It is to be understood that these modulation rates can be the same or different from one another.

What is claimed is:

1. A method comprising:
   receiving a frame containing a single preamble and a header over an air interface at a first modulation rate; and
   receiving a consolidated payload in the frame, at a second modulation rate different from the first modulation rate, wherein the consolidated payload includes multiple service data units;
   wherein the consolidated payload further includes information indicating when an end of each of the multiple service data units will occur;
   wherein the information includes multiple delimiters, each delimiter preceding an associated one of the multiple service data units and including an indication of a length of the associated service data unit;
   wherein a particular one of the delimiters further includes a validation field, the method further comprising determining whether the particular delimiter is valid using information in the validation field, and if the particular delimiter is not valid, finding another delimiter received in the consolidated payload and receiving another service data unit associated with said another delimiter.

2. An apparatus comprising:
   a medium access control device, to receive multiple service data units from a physical device; and
   the physical device, coupled to the medium access control device, which is operable to receive a frame containing a single preamble and a header over an air interface at a first modulation rate and to receive a consolidated payload in a same frame as the header at a second modulation rate different than the first modulation rate, wherein the consolidated payload includes the multiple service data units;
   wherein the consolidated payload further includes information indicating when an end of each of the multiple service data units will occur, the information further including multiple delimiters, each delimiter preceding an associated one of the multiple service data units and containing an indication of a length of the associated service data unit;
   wherein each delimiter further includes a validation field, and the physical device is further operable to determine whether a particular delimiter is valid using information in the validation field of the particular delimiter, and to find, if the particular delimiter is not valid, another delimiter received in the consolidated payload after the particular delimiter and to receive another service data unit associated with said another delimiter.

3. The apparatus of claim 2, further comprising one or more antennae, coupled to the physical device, which are operable to provide an interface between the air interface and the physical device.

4. A computer-readable medium having program instructions stored thereon to perform a method, which when executed within a wireless local area network device, result in:
   receiving a frame containing a single preamble and a header over an air interface at a first modulation rate; and
   receiving a consolidated payload in the frame at a second modulation rate different than the first modulation rate, wherein the consolidated payload includes multiple service data units;
   wherein the consolidated payload further includes information indicating when an end of each of the multiple service data units will occur;
   wherein the information includes multiple delimiters, each delimiter preceding an associated one of the multiple service data units, each delimiter including an indication of a length of the associated service data unit;
   wherein each of the delimiters further includes a validation field, and executing the program instructions further results in determining whether a particular delimiter is valid using information in the validation field of the particular delimiter, and finding, if the particular delimiter is not valid, another delimiter received after the particular delimiter in the consolidated payload and receiving another service data unit associated with said another delimiter.

* * * * *